(12) United States Patent
Williams

(10) Patent No.: US 12,209,690 B1
(45) Date of Patent: Jan. 28, 2025

(54) PIPE PULLING APPARATUS

(71) Applicant: David Roger Williams, Ripon, WI (US)

(72) Inventor: David Roger Williams, Ripon, WI (US)

( * ) Notice: Subject to any disclaimer, the term of this patent is extended or adjusted under 35 U.S.C. 154(b) by 99 days.

(21) Appl. No.: 17/899,608

(22) Filed: Aug. 30, 2022

Related U.S. Application Data

(60) Provisional application No. 63/239,391, filed on Aug. 31, 2021.

(51) Int. Cl.
*F16L 1/028* (2006.01)
*F16L 1/06* (2006.01)
*F16L 55/18* (2006.01)

(52) U.S. Cl.
CPC .............. *F16L 1/028* (2013.01); *F16L 1/06* (2013.01); *F16L 55/18* (2013.01)

(58) Field of Classification Search
CPC ... F16L 1/028; F16L 1/032; F16L 1/06; F16L 55/18; F16L 55/165; F16L 55/1657; F16L 55/1658
USPC ................................ 405/184.1, 184.2, 184.3
See application file for complete search history.

(56) References Cited

U.S. PATENT DOCUMENTS

| 2,297,164 | A | 9/1942 | Rainwater |
| 4,507,019 | A | 3/1985 | Thompson |
| 5,211,509 | A | 5/1993 | Roessler |
| 5,328,297 | A | 7/1994 | Handford |
| 6,305,880 | B1 | 10/2001 | Carter et al. |
| 6,524,031 | B2 | 2/2003 | Carter et al. |
| 6,669,406 | B2 * | 12/2003 | Hutton ...................... F16L 1/06 405/184.3 |
| 6,793,442 | B2 | 9/2004 | Carter et al. |
| 6,799,923 | B2 | 10/2004 | Carter et al. |
| 7,351,011 | B2 * | 4/2008 | Wang ...................... F16L 55/30 405/184.2 |

(Continued)

FOREIGN PATENT DOCUMENTS

| EP | 2341274 | 12/2010 |
| NL | 1006932 | 3/1999 |

(Continued)

OTHER PUBLICATIONS

English language translation of abstract of NL1006932, as viewed at https://worldwide.espacenet.com/patent/search/family/019765606/publication/NL1006932C2?q=nl1006932 on Mar. 25, 2024. 1 page.

*Primary Examiner* — Frederick L Lagman
(74) *Attorney, Agent, or Firm* — Brannen Law Office, LLC

(57) ABSTRACT

The present invention relates to a pipe puller having a face plate that can be positioned to avoid a sewer pipe when being used to remove pipe made of lead or other material. The pipe pulling apparatus can be used with a machine such as a mini excavator. The pipe pulling apparatus has a mount that attaches it to the machine. The apparatus further has a frame with a top and a bottom. The top is rotatably and lockably connected to the mount with a pin lock. Two legs can be independently secured to the bottom of the frame. The face plate can be oriented for use with left/right/both legs by rotating and flipping the face plate. Face plate bears against the pit wall. The selected orientation of the plate allows for clearance of the sanitary sewer pipe when the water pipe is being pulled.

18 Claims, 31 Drawing Sheets

(56) References Cited

U.S. PATENT DOCUMENTS

| | | | |
|---|---|---|---|
| 8,061,001 B2 | 11/2011 | Tjader | |
| 8,550,438 B2 | 10/2013 | Cilliers | |
| 8,702,349 B2 | 4/2014 | Carter et al. | |
| 8,720,038 B2 | 5/2014 | Tjader | |
| 8,899,878 B2 | 12/2014 | Tjader | |
| 9,261,220 B2 | 2/2016 | Tjader | |
| 9,566,675 B2 | 2/2017 | Tjader | |
| 10,167,986 B2 | 1/2019 | Tjader | |
| 10,240,691 B2 | 3/2019 | Tjader | |
| 10,349,069 B2 | 7/2019 | Cilliers et al. | |
| 10,550,961 B2 | 2/2020 | Nippes | |
| 10,571,063 B2* | 2/2020 | Tjader | F16L 1/028 |
| 10,584,807 B2 | 3/2020 | Wentworth et al. | |
| 10,598,306 B2 | 3/2020 | Carter et al. | |
| 11,009,174 B2 | 5/2021 | Carter et al. | |
| 11,674,629 B2* | 6/2023 | Tjader | F16L 1/032 |
| | | | 405/184.3 |
| 2004/0146361 A1* | 7/2004 | Hau | F16L 55/1658 |
| | | | 405/184.3 |
| 2013/0156505 A1* | 6/2013 | Tjader | B66D 3/006 |
| | | | 405/184.3 |
| 2019/0049040 A1* | 2/2019 | Wentworth | F16L 1/028 |

FOREIGN PATENT DOCUMENTS

| | | |
|---|---|---|
| WO | 2009026262 | 2/2009 |
| WO | 2010084340 | 7/2010 |

\* cited by examiner

PIPE PULLING APPARATUS

This United States utility patent application claims priority on and the benefit of provisional application 63/239,391 filed Aug. 31, 2021, the entire contents of which are hereby incorporated herein by reference.

BACKGROUND OF THE INVENTION

1. Field of the Invention

The present invention relates to a pipe pulling apparatus, and in particular to a pipe pulling apparatus having a plate that can be positioned to avoid a sewer pipe when pipe pulling apparatus is used to remove an existing water pipe.

2. Description of the Related Art

Lateral pipes carry water from the water main to a location inside of a home or building, often in a basement when one exists. Lateral pipes are normally buried under the ground surface, usually at least several feet deep. This protects the pipes from damage during winter and also prevents damage to the pipes from surface events such as a car driving over the surface.

It used to be customary to connect houses to a municipal or common water source using lateral pipes made of lead. Lead was likely used as it was a stable material, was flexible and abundant. It has been learned over the years that the use of lead pipes is dangerous as it can contaminate drinking water. Lead pipes have not been used in new construction for decades. Yet, many homes exist that still have lead pipes. There is thus an important reason to replace existing lead pipes with other pipes, such as copper or plastic pipes.

Other reasons to replace pipes, such as copper or galvanized steel/iron lateral pipes is that they may become corroded to the point of failure. Further, it is recommended to replace galvanized steel/iron pipe if it was used downstream of a lead pipe due to risks associated with harboring lead particles, due to porosity.

Yet, the removal of old pipes is not necessarily an easy endeavor. One way to remove an existing lateral pipe is to excavate from the water source main, or curb stop valve, to the house. This open trench approach is time consuming, messy, can damage or destroy landscaping and have other disadvantages. Soil from the trench is often mounded. It may take years for mounded soil to settle.

Due to the drawbacks associated with open trench removal, people have endeavored to use trenchless techniques to remove lead pipes. One advantage of trenchless removal is that only a single pit is excavated. The pit is typically excavated at or near the water curb stop valve, which is typically located relatively close to a street or sidewalk. The size of the pit is limited in size as it only needs to be large enough and deep enough to accommodate working room around existing pipes and to accommodate machinery as required and desired safety shoring devices (to maintain safe conditions within the pit). Minimizing the size of the pit minimizes the site restoration required.

One common practice is to thread a cable through an existing pipe and to grip the proximal end of the cable with a machine, such as an excavator, backhoe, or even a truck. The machines are usually able to exert a pulling force that is sufficient to either pull the pipe or break the cable.

Yet, this technique can be problematic. First, the pulling angle will not be generally horizontal. Instead, the pulling force will be angled, having vertical and horizontal components, as dictated by the position of the end of the pipe and the pit length and depth dimensions. The vertical force component is not beneficial for pulling the pipe in a horizontal direction and will result in excess strain to the cable. This can increase the chances that the cable will break.

The vertical force can also cause an upward creep of the cable and old pipe during the pulling process. Upon completion of the removal of the old pipe and insertion of the new pipe, any upward creep will result in the new pipe being installed at a shallower depth than the original pipe. A shallower depth could be in conflict with state and local codes, and present possible freezing issues for the new pipe.

In urban settings, the pulling machines may be pulling an unshielded cable or pipe across a street. If a cable breaks, this could put crew members, street traffic and any bystanders in danger. Optionally, a pulley can be incorporated at the top of the pit to turn the direction of the force by 90 degrees. Yet, the pulled cable or pipe is still unprotected or unshielded, and the pulley could add additional strain on the cable, further increasing odds of cable breakage.

A winch can be used to overcome these issues. In particular, a winch can be used to apply a pulling force in a horizontal direction parallel to the existing pipe longitudinal axis. This minimizes cable strain and prevents upward creep. Further, there is no exposed length of cable outside of the pit, should the cable break.

Yet, there are still challenges to overcome with trenchless lead pipe removal, even when using a winch. For example, sometimes the lead pipe is positioned in close proximity to a sanitary sewer pipe (vitrified clay, Orangeburg pipe, cast iron, PVC, or otherwise). Sanitary sewer pipes are susceptible to being damaged. It may not be possible to position existing trenchless pipe pullers in a safe position to pull the lead pipe without clearing and/or causing damage to the sanitary sewer pipe. If the sanitary sewer pipe is damaged, then the project becomes a larger project as the sanitary sewer pipe needs to be replaced or repaired. This could require a full excavation.

Thus, there exists a need for pipe pulling apparatus that solves these and other problems.

SUMMARY OF THE INVENTION

The present invention relates to a pipe puller having a face plate that can be positioned to avoid a sewer pipe when being used to remove pipe made of lead or other material (such as galvanized steel/iron or copper). The pipe pulling apparatus can be used with a machine such as a mini excavator. The pipe pulling apparatus has a mount that attaches it to the machine. The apparatus further has a frame with a top and a bottom. The top is rotatably and lockably connected to the mount with a pin lock. Two legs can be independently secured to the bottom of the frame. The face plate can be oriented for use with left/right/both legs by rotating and flipping the face plate. Face plate bears against the pit wall. The selected orientation of the plate allows for clearance of the sanitary sewer pipe when the water pipe is being pulled.

According to one advantage of the present invention, the pipe pulling machine is used in trenchless pulling, which requires minimal digging and results in minimal damage to surrounding areas (trees, landscaping, sidewalks, etc.). A pit is typically dug in an area where the lead pipe is hooked up to a main water supply line or to a connection point between the main and the house or other structure. The lead pipe then has to be removed and replaced (with a replacement pipe, such as copper or plastic pipe) in order to reconnect the house to the water supply.

In use, if the property has a basement, a person first removes a section of concrete and removes a lead pipe up to where it meets the soil. A cable (or wire or rope, etc.) is inserted into the lead pipe from the basement end and fed to the pit. It is noted that, for purposes of the present invention, the words cable, wire and rope can be used interchangeably for a flexible structure that is fed through a pipe and can be used to remove the pipe. A cable end termination is on one end of the cable and a coupler is on the opposite side of the cable end termination. The cable, after being fed through the pipe is connected to a winch. A new pipe, which can be a plastic pipe or a copper pipe, is connected to the coupler. The winch is then operated to pull the lead pipe out and simultaneously pull the new pipe in.

According to another advantage of the present invention, the pipe pulling assembly provides support against a pit wall. In this regard, a face plate is provided to transfer force from the pulled pipe to the pit wall. Force from the winch is transferred from the pulling force applied to the distal end of the cable in the pipe to the face plate. It is desired that the face plate have a sufficient size (surface area) to create an anchor to prevent pit wall soil from yielding causing the winch to twist. Further it is desired that there is surface area on greater than 180 degrees around the pipe being pulled to create a stable anchor that will prevent the pulling force from twisting the winch as force is applied.

It is often discovered that the sewer pipe and water pipe were installed in close proximity and parallel to each other. Often times, the pipes are within 1-6 inches of each other. According to a still further advantage yet of the present invention, the plate has a force bearing surface that disperses force on both sides, diagonally, of where the lead pipe passes through the plate. This is advantageously accomplished by having a plate with two arms on one end section and one arm on the other and the resulting diagonal orientation between the single arm and the oppositely located one of the two arms on the other end. Advantageously, the face plate of the present invention provides surface area 270 degrees around the pipe being pulled to allow the pulling force to be transferred to the pit wall and prevent twisting of the machine.

According to a still further advantage of the present invention, the frame can have two independently removably legs. The legs advantageously support a face plate to prevent bending thereof. Further, the plate can be oriented to operate with both legs (when the sewer pipe is not too close to the lead pipe) or with either the left or right leg, as appropriate, in the event that the sewer pipe is laterally too close to the lead pipe (the use of two legs would not clear the sewer pipe). Avoiding the sewer pipe, or even avoiding being close to it, reduces the chance that the sewer pipe would be damaged as the lead pipe is being removed.

According to an advantage an alternative embodiment, the face place can be used with a frame with one fixed leg and one removable leg, wherein the frame is rotatable 180 degrees. In this embodiment, through rotation of the frame, the pipe pulling machine can be used for water pipes that are either left or right of the sewer pipe as the face plate can be oriented for use with left or right clearance.

According to a further advantage yet of the present invention, the face plate can overhang the sides and distal end of the legs. In this regard the overhang minimizes weight of the pipe puller while still providing adequate support to the plate to prevent bending thereof. This also increases the surface area of the face plate.

According to a further advantage yet of the present invention, the plate has a protrusion in a second end that covers a portion of sheave (not cover the channel) to protect the sheave from rocks and soil compression while allowing the pipe to still be pulled around the sheave. This also increases the surface area of the plate acting against the pit sidewall, resulting in a greater dispersion of the force the plate is placing on the pit wall.

According to a still further advantage yet of the present invention, the plate end with two arms has a slot between the arms. This allows a cable or pipe to pass into the slot and seat with the groove in the sheave as the pipe pulling machine is being lowered in to the pit. It also eliminates the need to thread a cable through a hole in the face plate. Further, this allows the pipe pulling machine to be raised out of the pit without disturbing or damaging the new pipe.

According to a further advantage of the present invention, the face plate can be attached to the frame through holes located in the vertical midline of the plate. This allows the plate to be balanced on the bottom of the frame to engage the pit sidewall.

According to a further advantage yet of the present invention, the frame can be placed in any selected rotational orientation relative to the mount. This is accomplished in one embodiment with a rotator that is a slew ring bearing. The slew ring bearing can have an outer ring plate with a perimeter having holes therethrough. One or more locks can be supported by the frame and have pins that selectably pass through the perimeter plate holes to rotationally lock the slew ring bearing outer ring plate with respect to the frame. In another embodiment, a locking clutch band can be used. Advantageously, this allows the pipe pulling machine to be adjusted relative to the pit wall and relative to the excavator so that the plate makes normal contact with the pit wall and to maintain a perpendicular orientation to the pipe.

It is sometimes found that, after the pit excavation is completed, the lead pipe is found to be located at the corner of the pit. This scenario is problematic as it can be difficult to pull lead pipes that are located in a corner of a pit as the pipe pulling machine sheave is generally centered with the middle of the drum. According to a further advantage of the present invention, the pipe puller can be oriented in a slanted or angled manner so that the pipe can still be pulled around the sheave even if the pipe is located in a corner. This is advantageously accomplished as the face place is held perpendicular to the lead pipe.

According to an advantage of an alternative embodiment of the present invention, a corner access assembly with indexing side rollers can be provided along with a second bearing plate. The side rollers can be oriented to change direction of the pulling force, still move around the sheave, and ultimately be wound on a drum by the winch. This allows the pipe pulling assembly to be used in corners and still pull the pipe.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
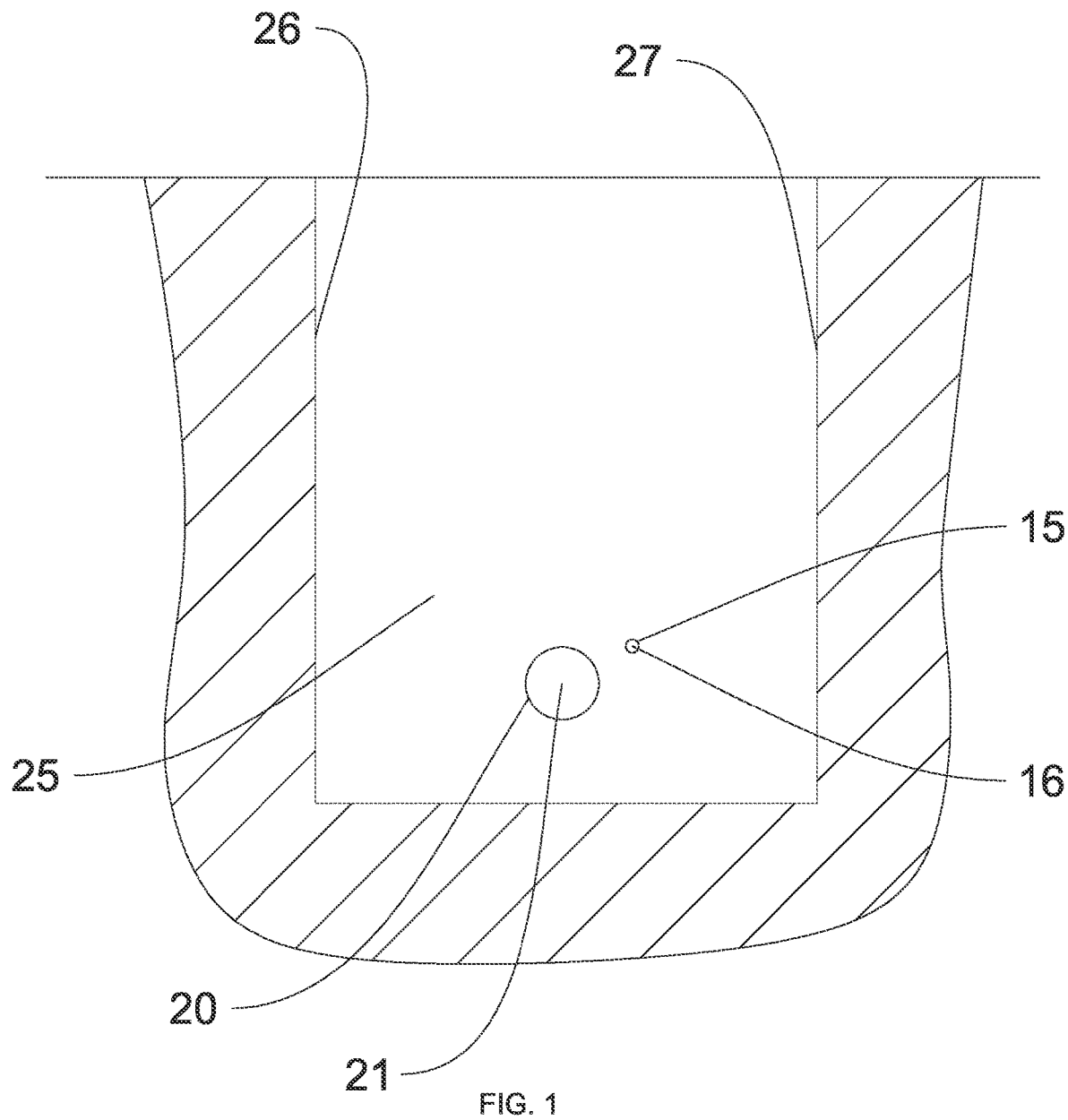
FIG. 1 is an end view of an excavated pit showing a lead pipe next to a sewer pipe.
Figure 2:
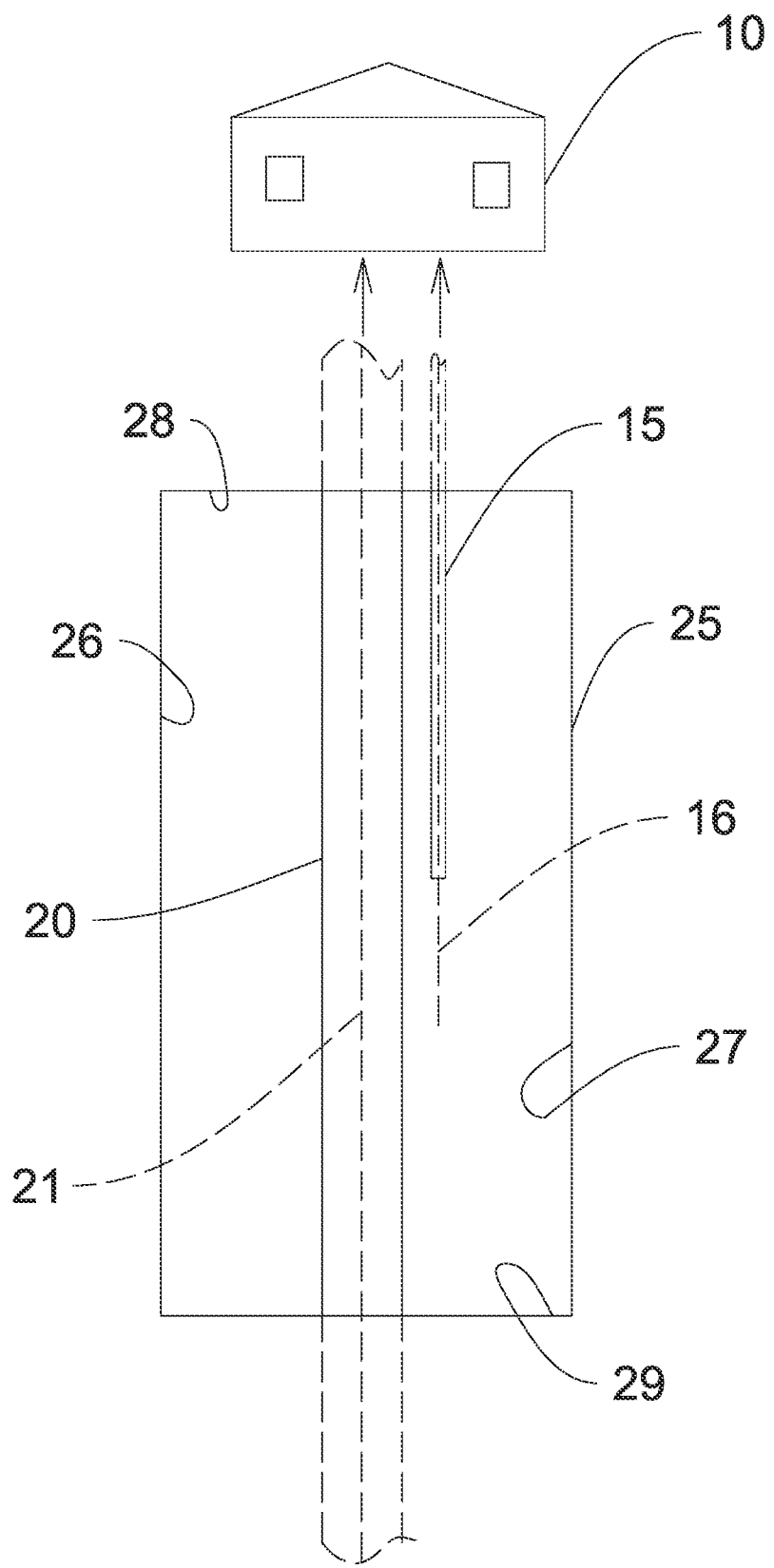
FIG. 2 is a top view of the pit shown in FIG. 1.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention is used to pull pipes, such as a lead water pipe 15 from the ground when it is being replaced at a house 10 or other building. It is understood that while the pipe is often described as being a lead pipe, that the invention is not limited for use with lead pipes. The pipe 15 is somewhat flexible but generally is laid in a straight line with a pipe axis 16. Often times, the water pipe 15 is laid in close proximity to a sewer pipe 20, sometimes within inches. The sewer pipe is often made of clay or other fragile material and has a pipe axis 21. Municipal or private crews often excavate the pits at a location close to a main water supply. Then, a property owner is tasked with replacing the existing pipe 15 with a replacement pipe.

A pit 25 has sides 26 and 27 and ends 28 and 29. The pits usually are only a few feet wide and several feet long. A pit can be several feet deep and is usually excavated to a depth of just below the existing water pipe. Examples of pits are shown in FIGS. 1, 2, and 4-9.

Figure 10:
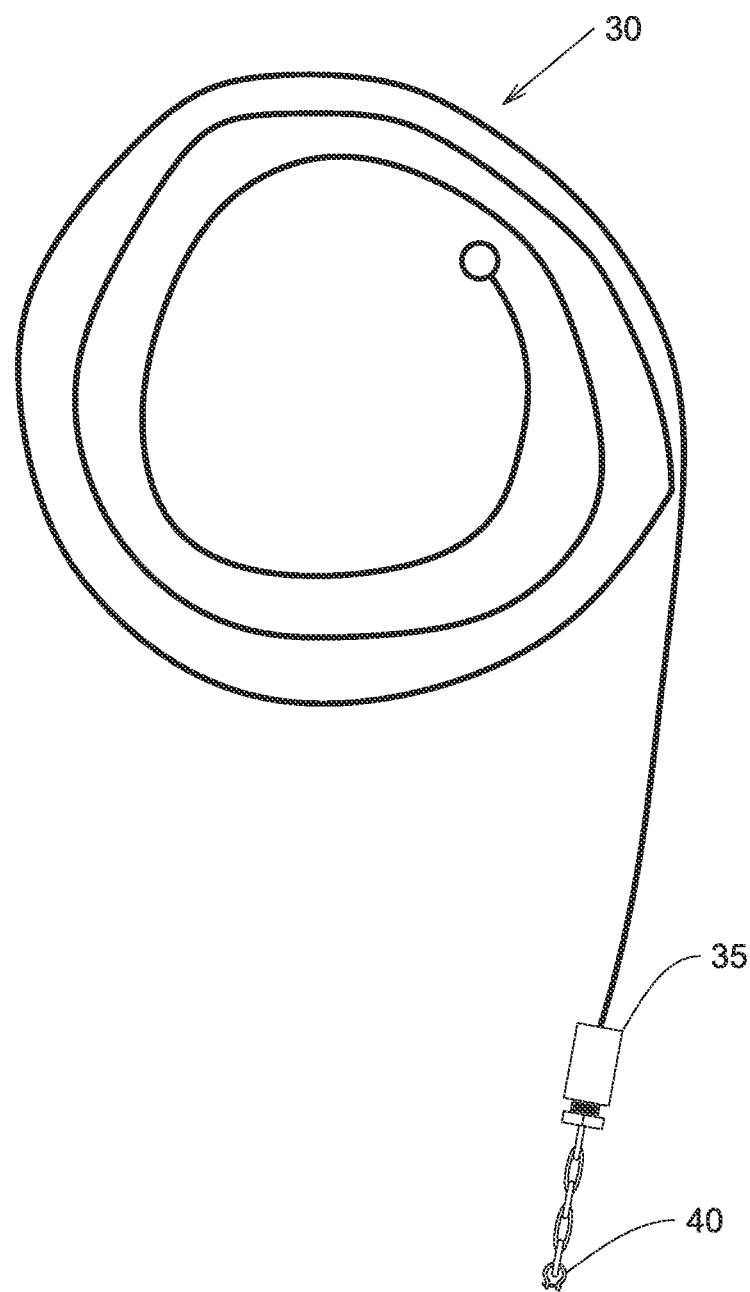
FIG. 10 is a close up of a device attached to an end of the cable fed through the lead pipe, and attached to the leading end of the new pipe.

Looking at FIG. 10, it is seen that a cable 30 is provided and is connected to a cable end termination 35. The cable end termination preferably has a swaged button stop and is on the distal end of the cable. A coupler 40 is on the opposite side of the cable end termination from the cable 30. The coupler connects to the button stop and allows for a connection point to attach a device which couples to the replacement water service line or pipe to be pulled into the space vacated by the pulled pipe. The proximal end of the cable is fed through the existing pipe 15, with the cable end termination contacting the distal end of the pipe 15 in the house. The coupler attaches to a new pipe to pull the new pipe through the path vacated by the lead pipe being removed.

Figure 3:
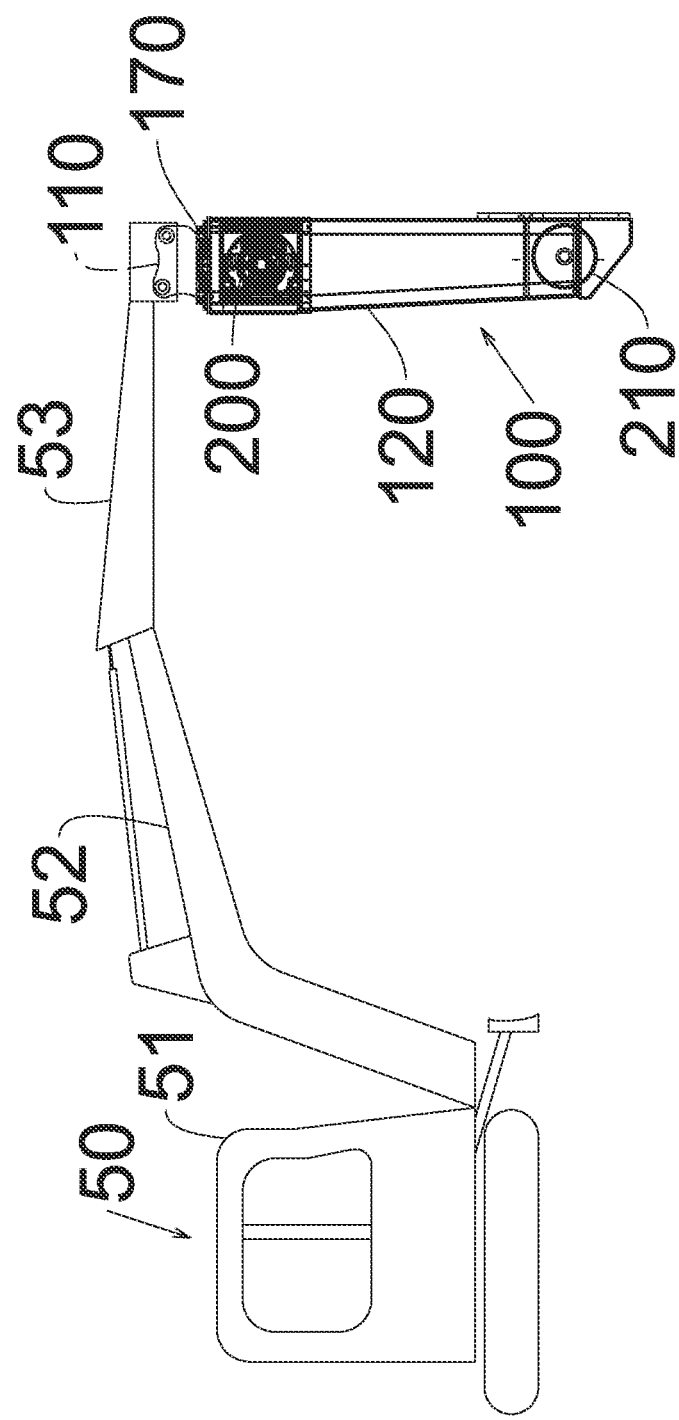
FIG. 3 is a side view of a pipe pulling assembly supported by a mini excavator.

A machine 50, such as a mini excavator, is shown in FIG. 3 being connected to a pipe pulling assembly 100 of the present invention. The machine 50 has a cab 51 containing controls, a boom 52 and a stick 53. The boom 52 and stick 53 cooperate to move the pipe pulling assembly 100. The cab 50 can swivel on a machine base, causing the boom 52 and stick 53 to rotate relative to the machine base. The boom 52 and stick 53 can be raised and lowered, and the boom and stick can cooperate to tilt the pipe pulling assembly in or out relative the end of the stick. It is appreciated that while a mini excavator is illustrated, that other machines could be used without departing from the broad aspects of the present invention.

One embodiment of a pipe pulling assembly is seen in FIG. 3. It has a mount 110, frame 120, a rotator 170, a lock 180, a winch 200, a sheave 210, a leg 220, a leg 230 and a plate 250. Each of these components are described below.

The mount 110 has two shafts 111 and 112. The stick 53 of the machine 50 and a cylinder connect to the shafts 111 and 112. The mount is seen in FIGS. 3-9, and others.

Figure 16:
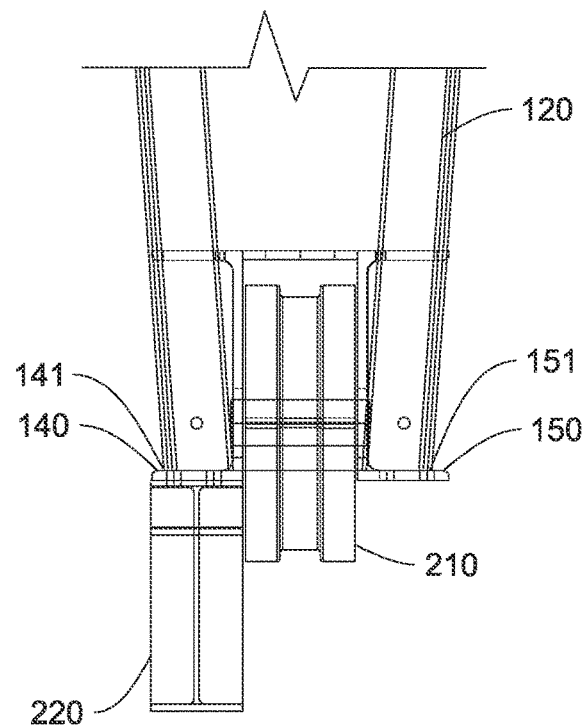
FIG. 16 is a view of the preferred embodiment of the frame with one leg attached.
Figure 17:
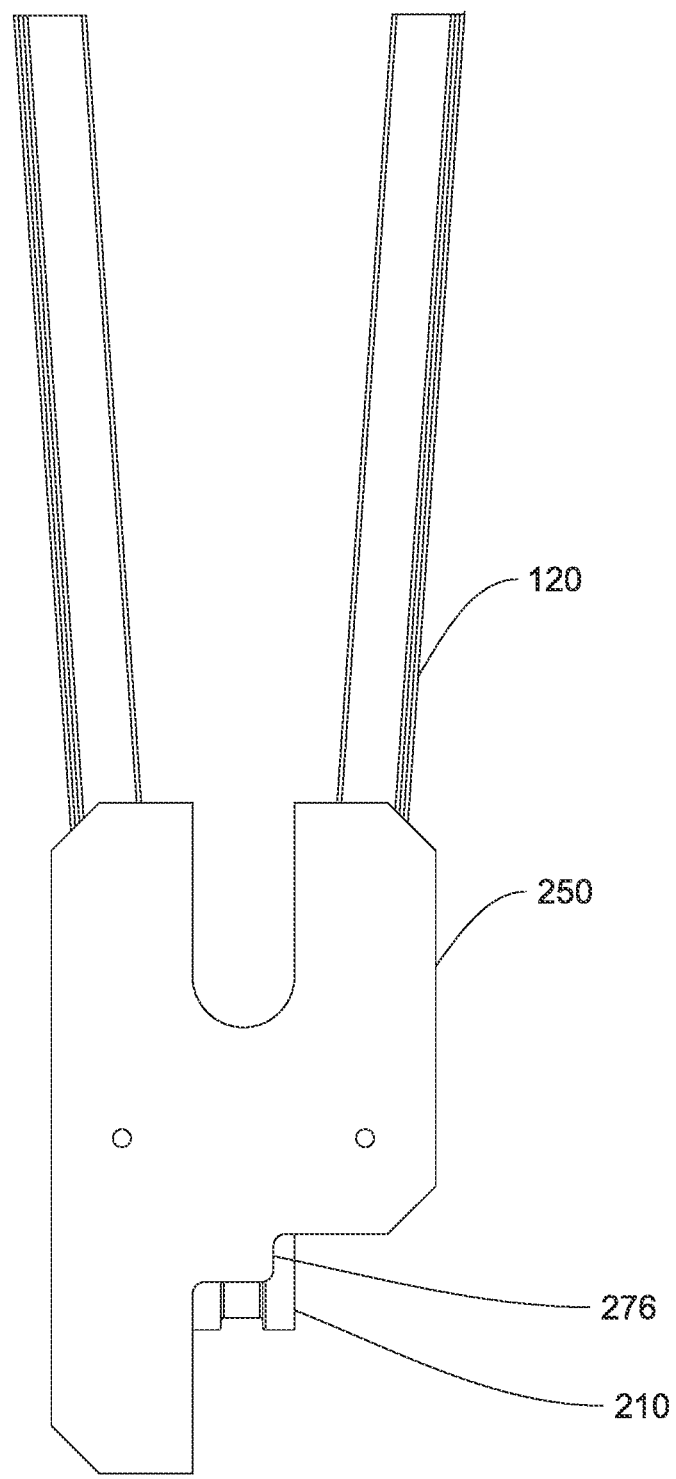
FIG. 17 is a front view showing the plate being oriented to be supported by the one leg.
Figure 30:
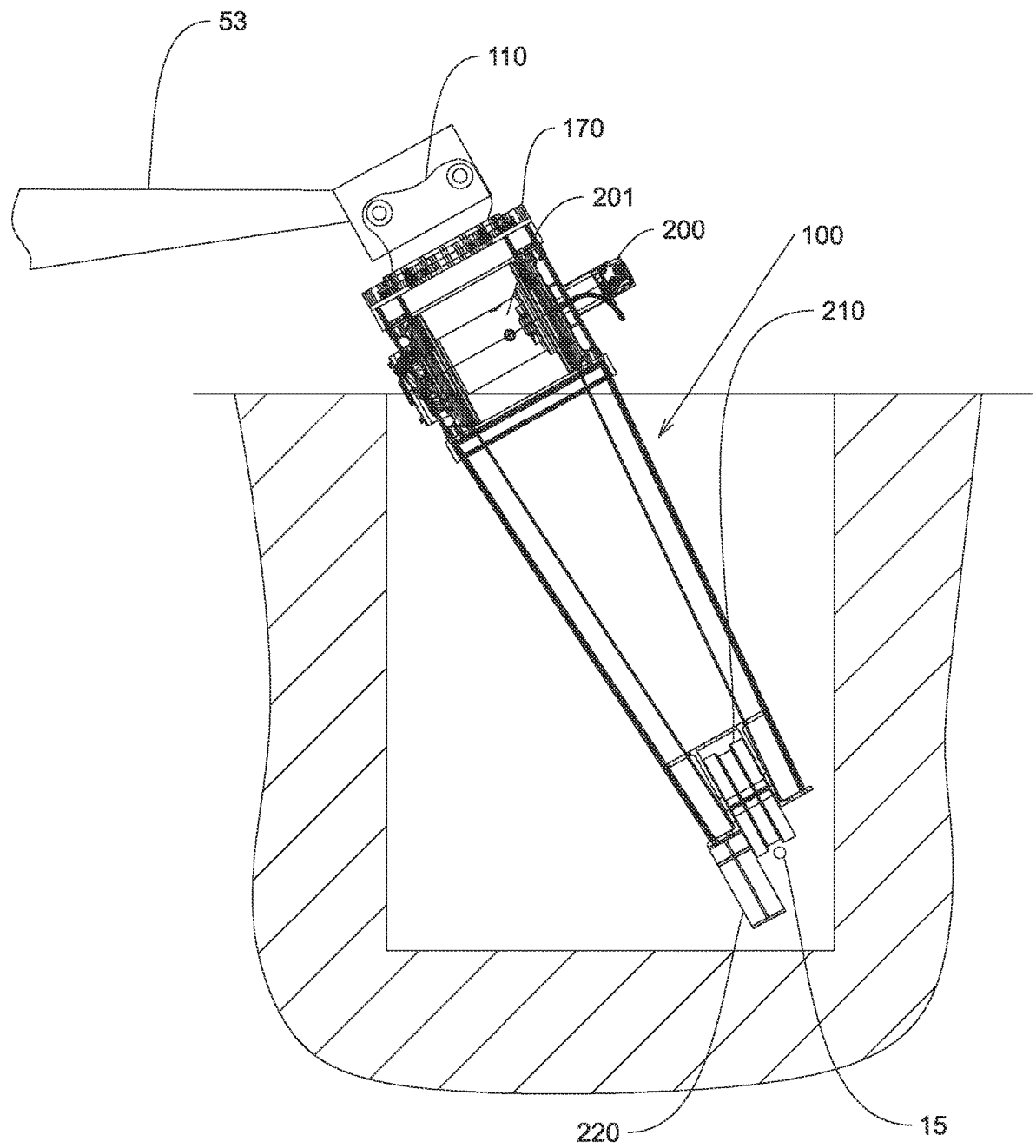
FIG. 30 is a perspective view showing the machine being angled so that it can reach into a corner of a pit.
Figure 31:
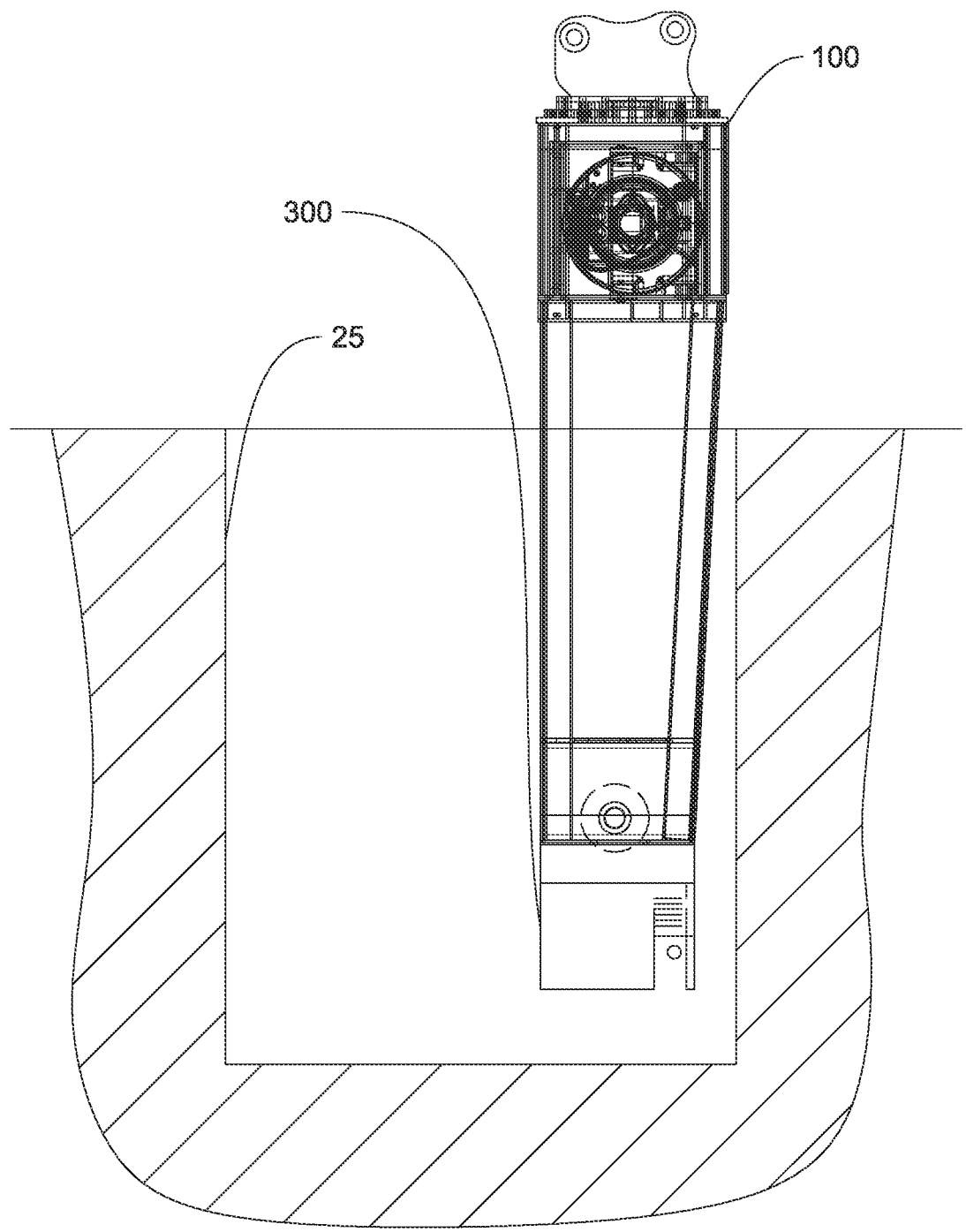
FIG. 31 is an end view showing a corner access assembly in position within a pit.
Figure 32:
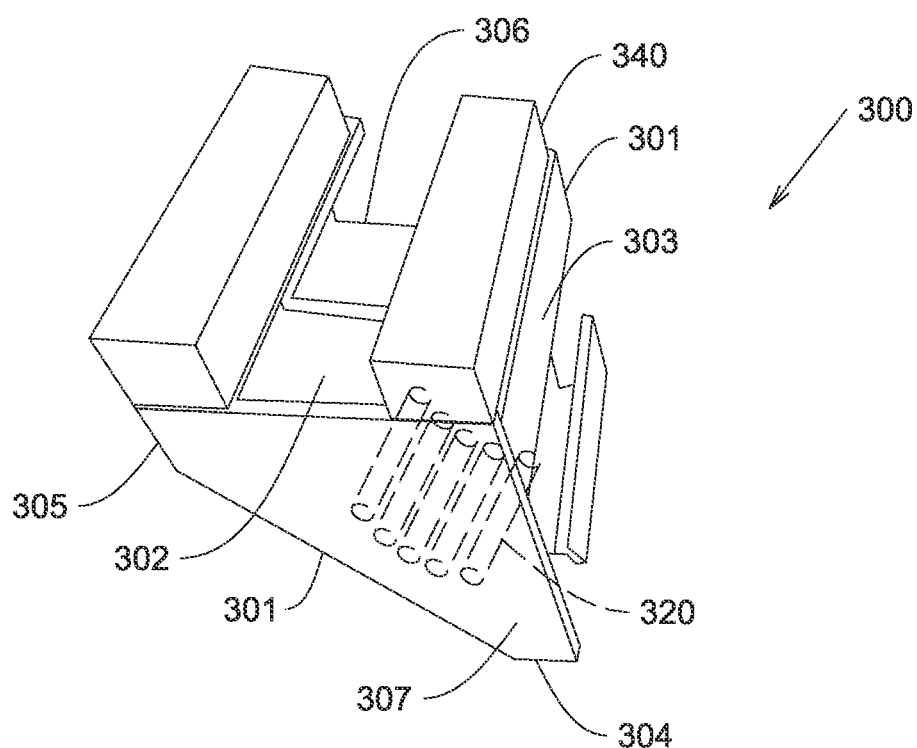
FIG. 32 is a perspective view of the corner access assembly.
Figure 33:
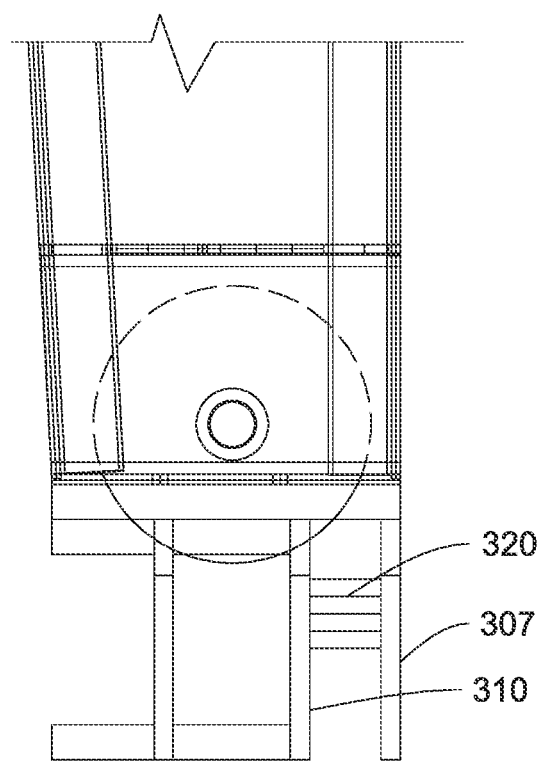
FIG. 33 is an end view of the attachment shown in FIG. 32.
Figure 34:
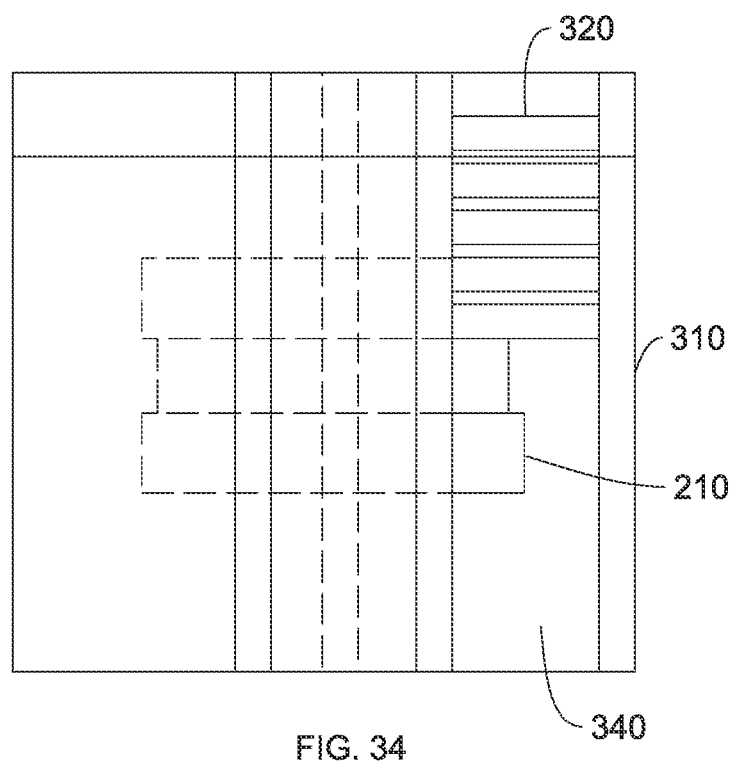
FIG. 34 is a bottom view showing an embodiment of a corner access assembly.

The frame 120, as seen in FIGS. 3, 30 and 31, among others, has a top 121, a bottom 122 and sides 123 and 124, respectively. The frame front 125 and back 126, between sides 123 and 124, is tapered being wider at the top 121 and narrower at the bottom 122. This allows the frame to have better access in the bottom of a pit. The sides 123 and 124 preferably have a slight taper from top to bottom (wider at top and narrower at the bottom). The front lies in a front plane and the rear lies in a rear plane. The front plane is preferably vertical with respect to the assembly 100, and the rear plane is a few degrees from parallel to the front plane. It is appreciated that, as an alternative, the front and rear planes could be parallel to each other. A top surface 130 can be at the top 121 of the frame 120. A bracket 140 with mounting holes 141 (FIG. 16) is on the bottom 122 of the frame on side 123. A bracket 150 with mounting holes 151 (FIG. 16) is on the bottom 122 of the frame on side 124. An optional cover, not shown, can be at the bottom 122 of the frame between sides 123 and 124.

Figure 28:
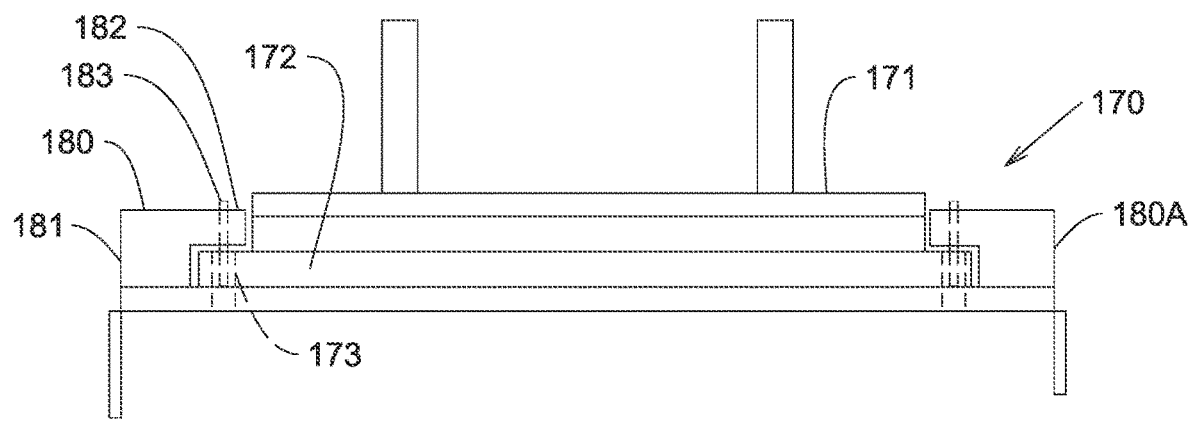
FIG. 28 is a close-up side view of a rotation lock.
Figure 29:
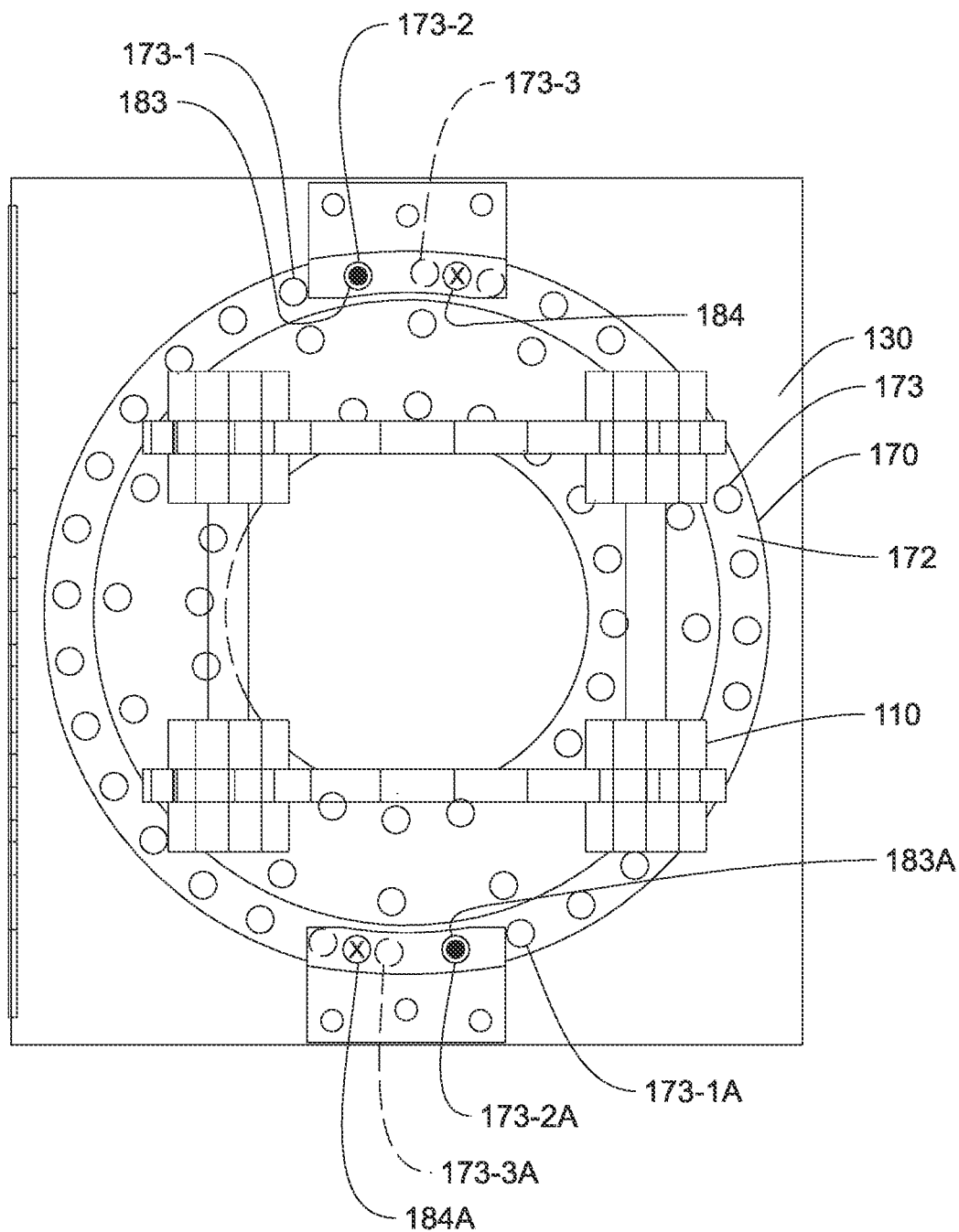
FIG. 29 is a top view showing a position of the rotation lock.
Figure 29A:
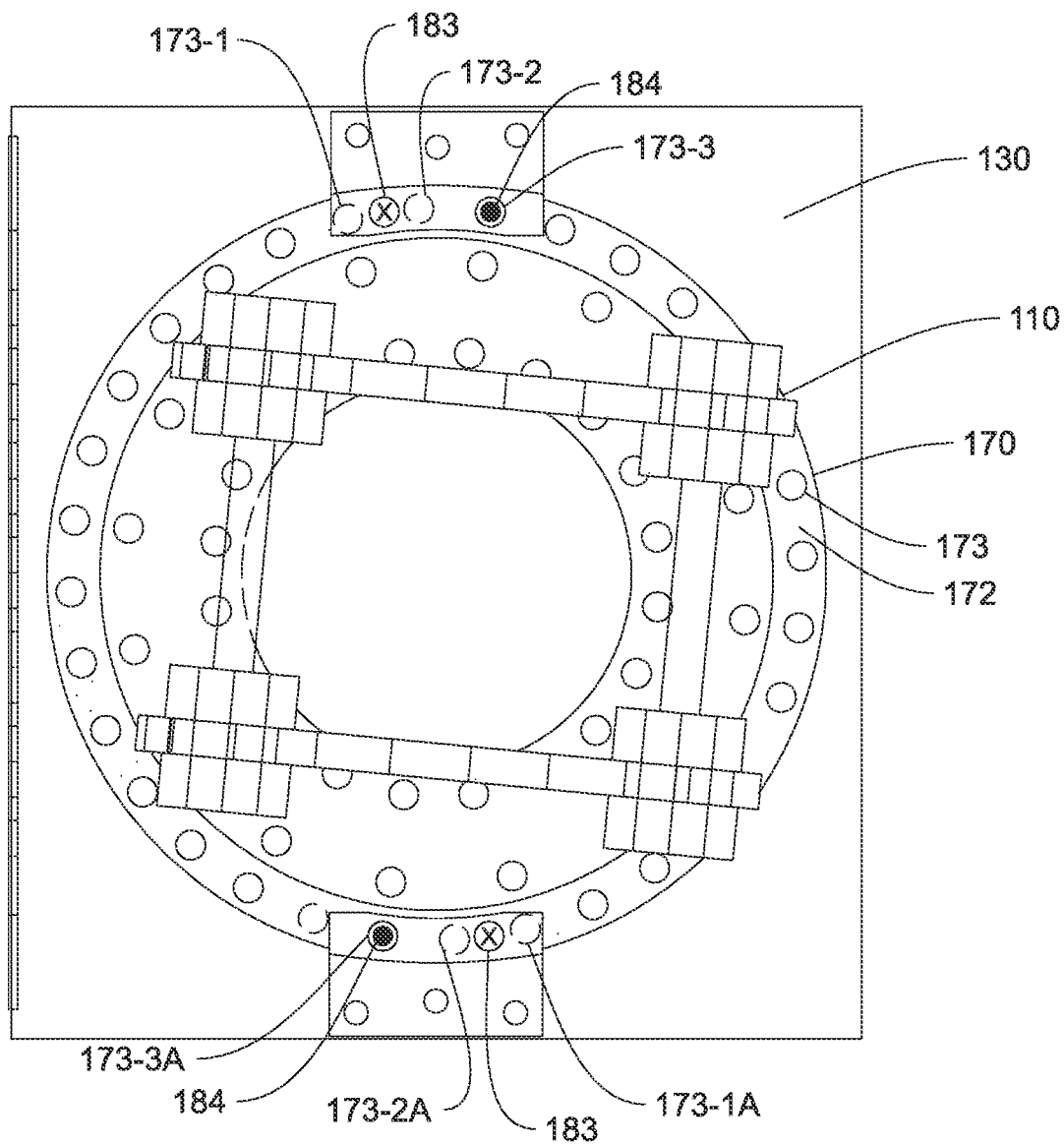
FIG. 29A is a top view showing a second position of the rotation lock.
Figure 29B:
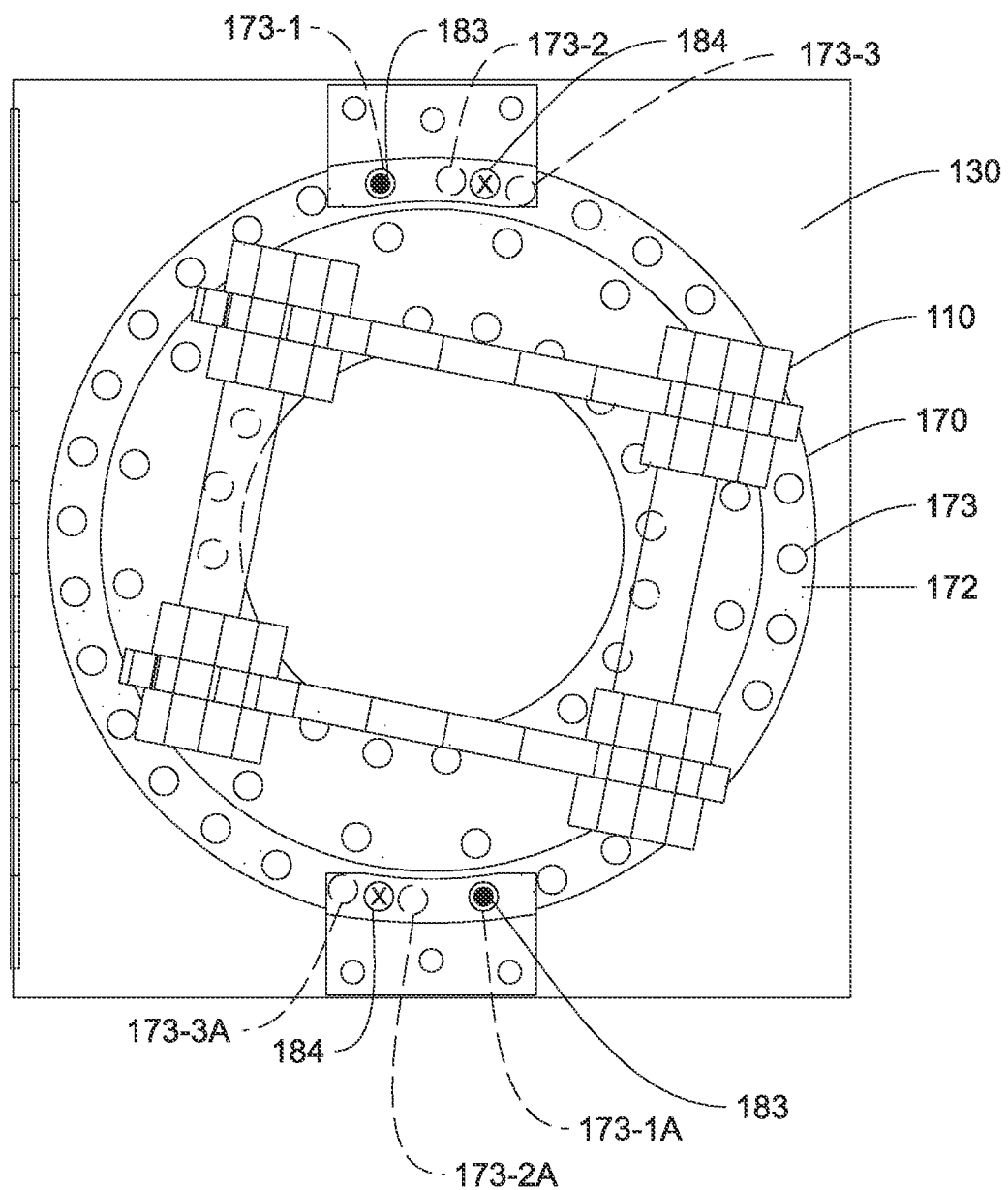
FIG. 29B is a top view showing a third position of the rotation lock.
Figure 29C:
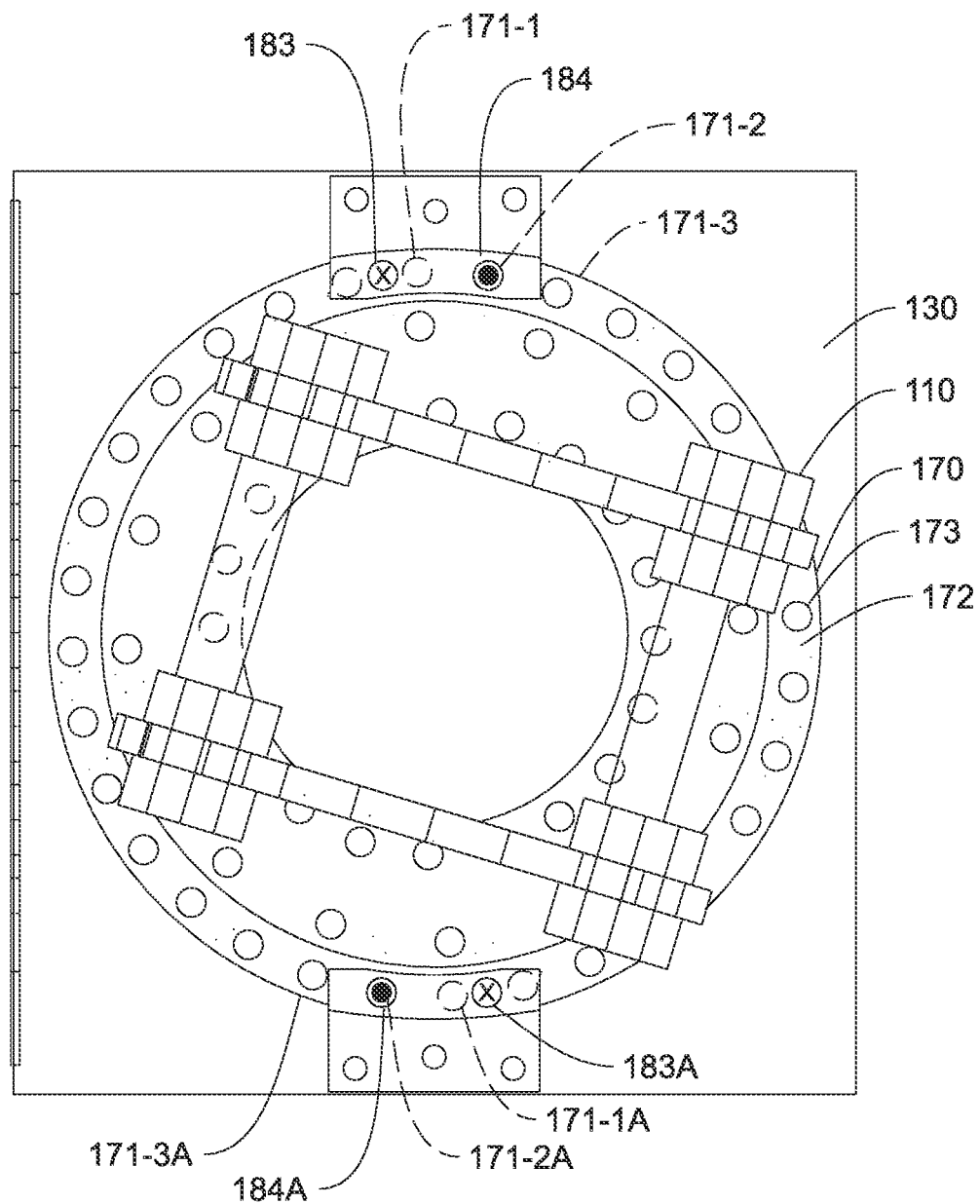
FIG. 29C is a top view showing a fourth position of the rotation lock.

A rotator 170 is illustrated in FIGS. 28-29C, among other figures. One preferred rotator 170 is a slew ring bearing 171. The slew ring 171 has a rotatable plate (relative to the frame) with an outer perimeter 172 with vertical holes 173. There are preferably 32 holes equally spaced about the outer perimeter of the slew ring 171. The slew ring 171 rotatably connects the mount 110 and the frame 120. The slew ring 171 is rigidly connected to the mount 110, and is also rigidly connected to the frame 120. In this regard, when the bearing is unlocked, the frame can rotate 360 degrees relative to the mount.

At least one lock 180 is provided. In the preferred and illustrated embodiment, there are two locks 180 and 180A spaced with respective centers being 180 degrees apart from each other relative to the outer perimeter of the slew ring 171. Lock 180 has a body 181 that is rigidly connected to the frame 120, preferably to the top surface 130. The lock body 181 has an upper lip 182 with two holes therethrough for receiving pins 183 and 184. Lock 180A is preferably the same as lock 180, having a body, a lip and two pins 183A and 184A that selectably extend through block holes to be received in one of the ring holes 173 and continues to extend into a corresponding hole in the top plate 130. When two locks are used, pins 183 and 183A are 180 degrees apart (relative to the slew ring), and pins 184 and 184A are 180 degrees apart (relative to the slew ring). It is appreciated that any suitable pin can be used. In the figures, a disengaged pin is denoted by an "X" indicating that is not inserted in a hole, and an engaged pin is denoted by a solid black circle indicating that it is received in a hole to make a locking connection.

In the preferred slew ring embodiment, the outer perimeter plate has 32 holes. These 32 holes, and the two lock pins on each lock results in there being preferably 64 rotational adjustments that can be made. The rotator 180 can be adjusted in 5.625 degree increments. To make this illustration, eight holes 173-1, 173-2, 173-3, 173-1A, 173-2A, and 173-3A are labeled. Hole 173-1 is separated from hole 173-1A by 180 degrees. Hole 173-2 is separated from hole 173-2A by 180 degrees. Hole 173-3 is separated from hole 173-3A by 180 degrees.

Turning now to FIGS. 29-29C, it is seen that four exemplary rotational adjustments are illustrated. In FIG. 29, pin 183 is received in hole 173-2, and pin 183A is received in hole 173-2A. FIG. 29A shows the next sequential locking point (in one direction), wherein pin 184 is received in hole 173-3, and pin 184A is received in hole 173-3A. FIG. 29B shows the next sequential locking point, wherein pin 183 is received in hole 173-1 and pin 183A is received in hole 173-1A. FIG. 29C shows the next sequential locking point, wherein pin 184 is received in hole 173-2 and pin 184A is received in hole 173-2A.

It is appreciated that while outer perimeter vertical pins are illustrated, that there can be numerous alternative rotators and locks that can be used without departing from the broad aspects of the present invention. For example, locking slots or holes could be used. Also, the rotator could have a rotor and a brake caliper to lock the selected rotational position of the frame.

It is preferred that the rotator be located between the mount and the frame, wherein the winch drum rotation axis and sheave rotation axis are parallel. This also allows the rotational orientation of the frame and mount to be locked and unlocked from outside of the pit. However, it is understood that the rotator could be located elsewhere without departing from the broad aspects of the present invention.

Figure 6:
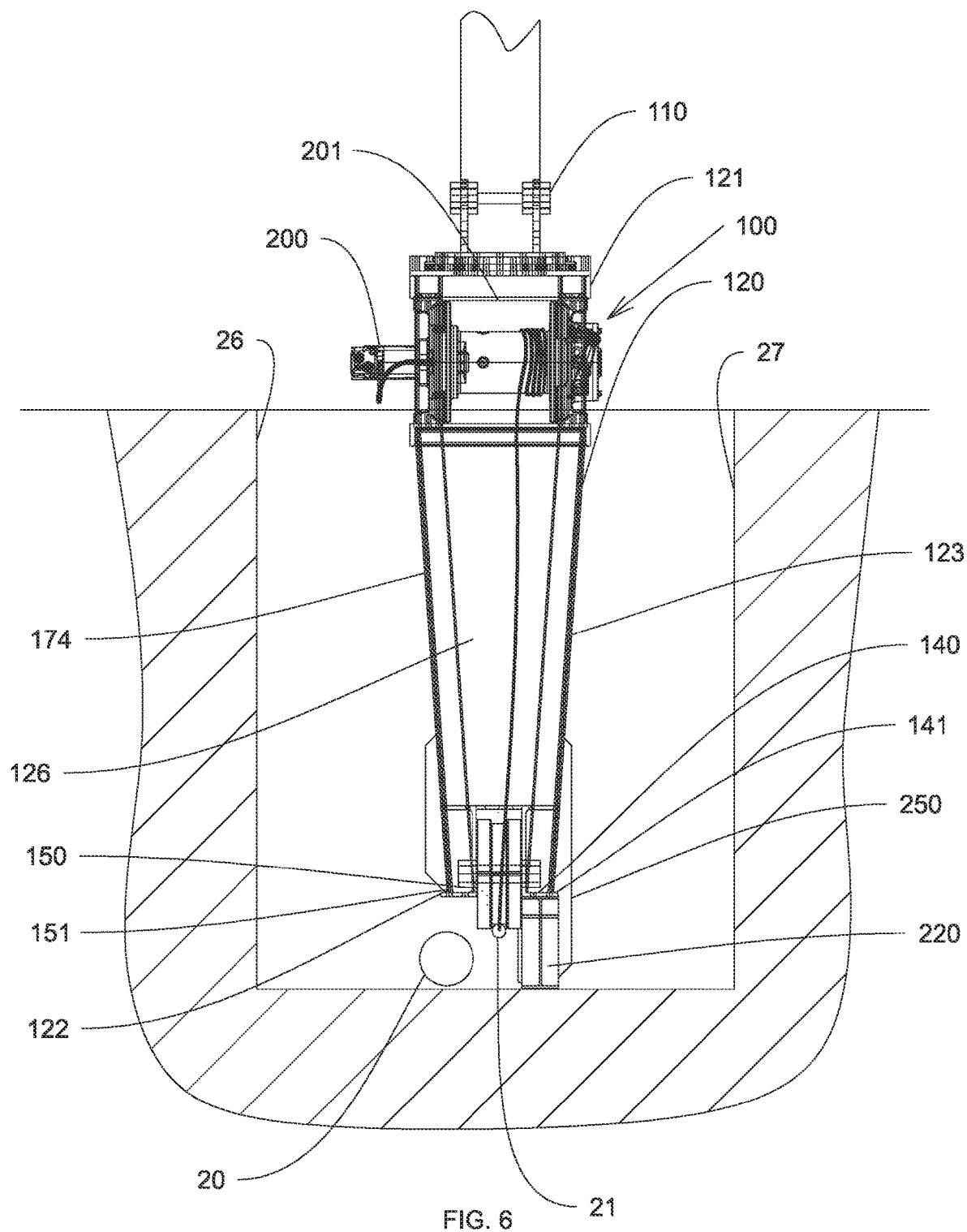
FIG. 6 is a rear view showing the pipe pulling assembly in position to pull a pipe.
Figure 7:
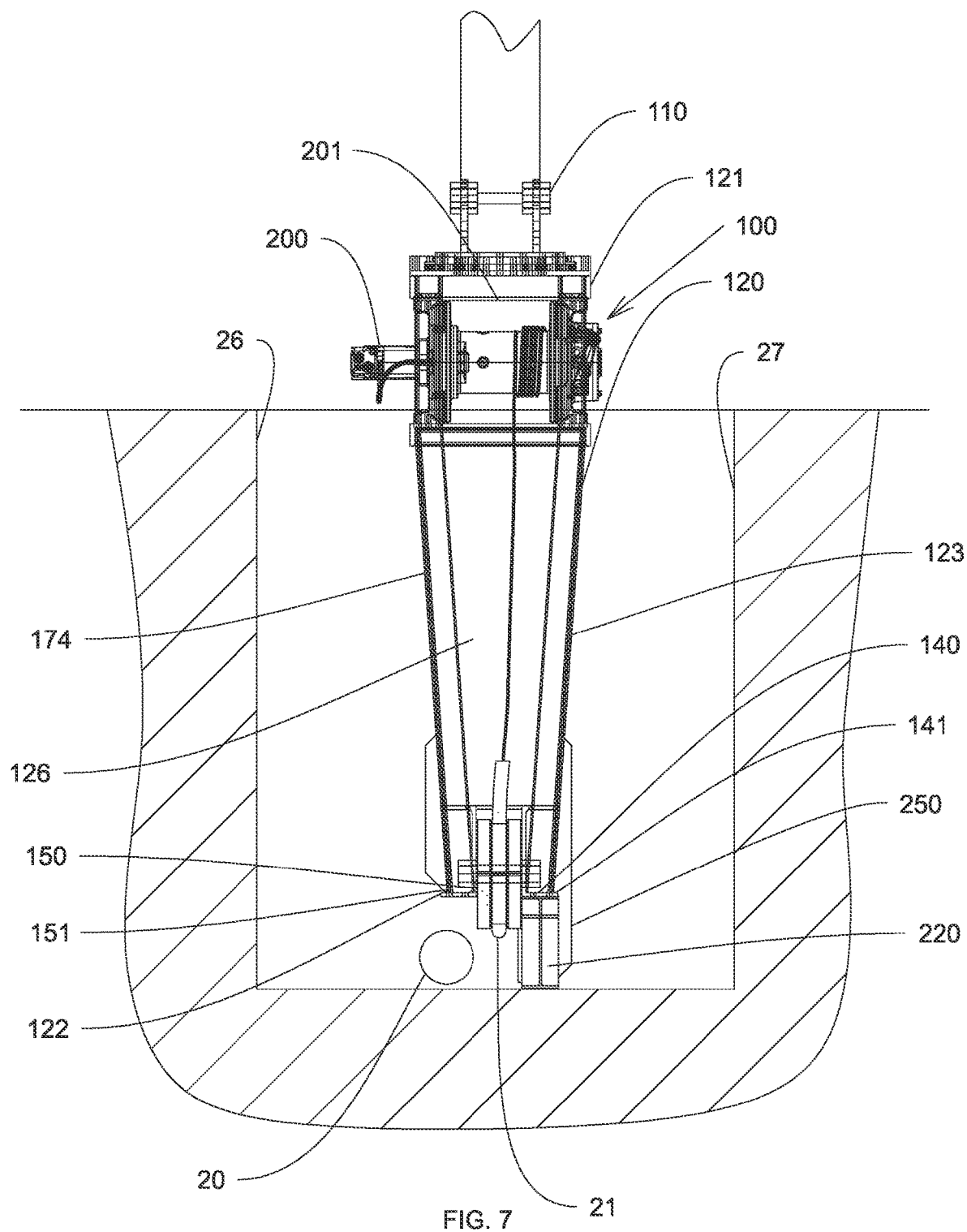
FIG. 7 is similar to FIG. 6 but shows the pulled pipe being pulled towards the drum.
Figure 8:
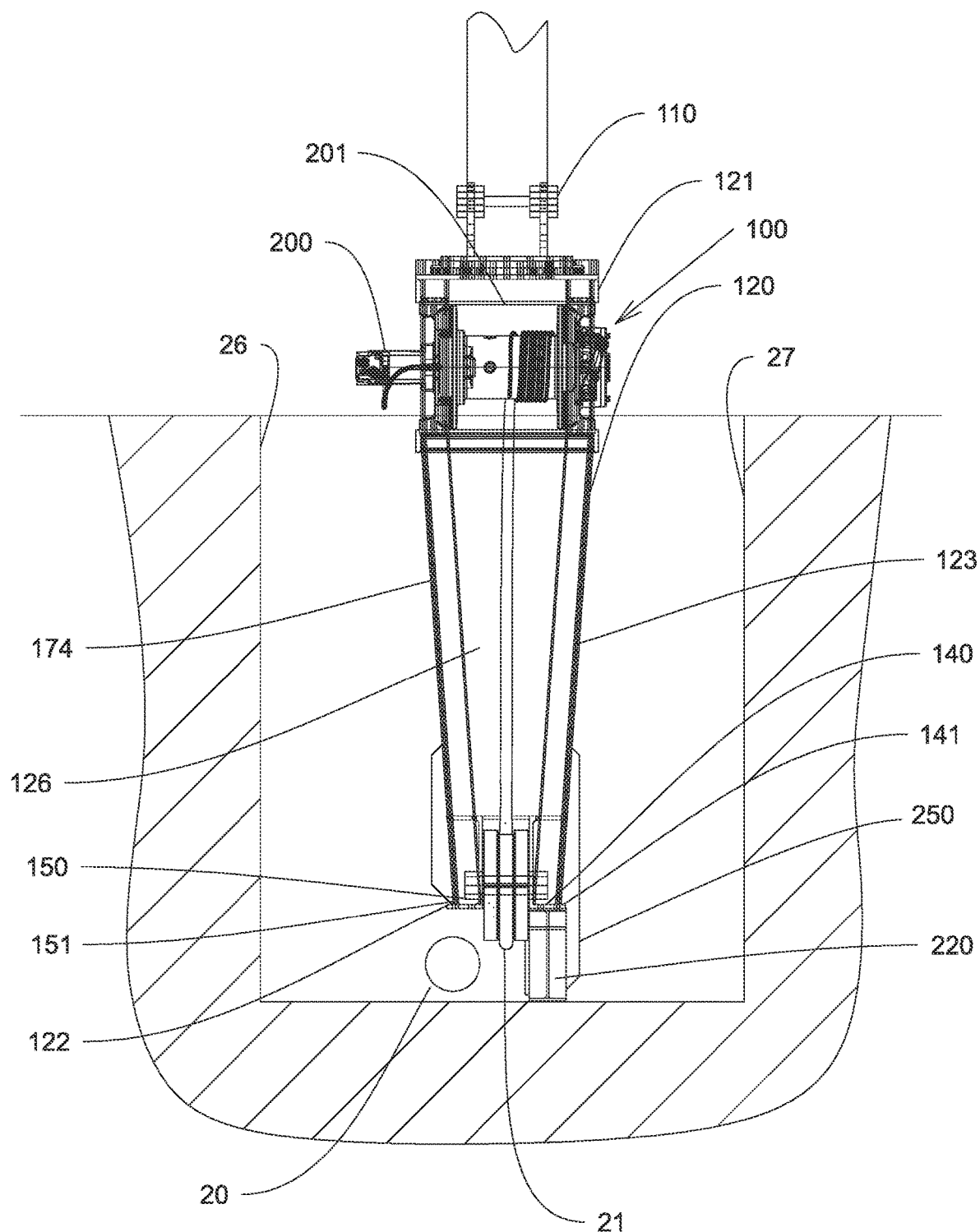
FIG. 8 is similar to FIG. 7 but shows the pipe being wound upon the drum.
Figure 9:
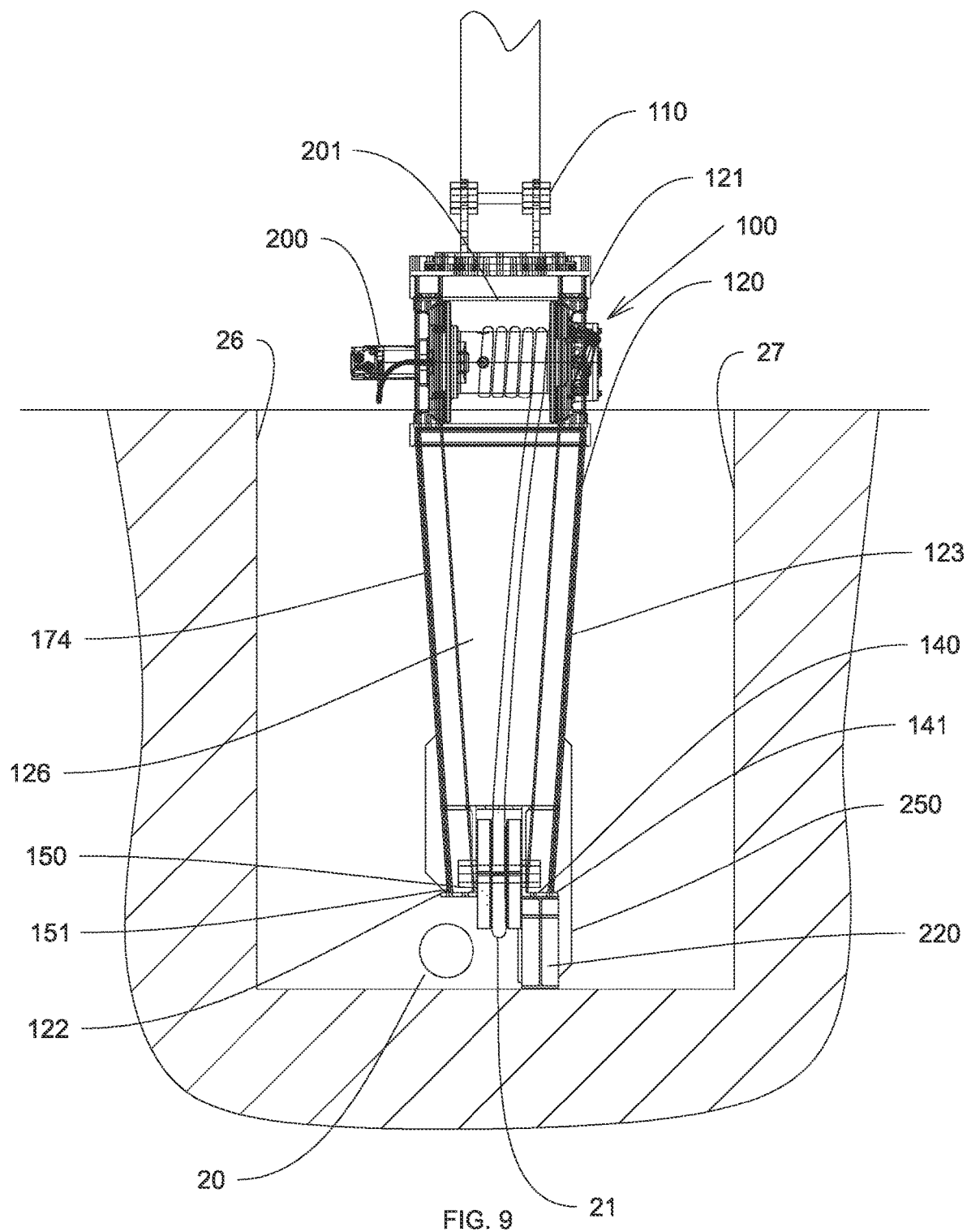
FIG. 9 is an alternative view of the pipe being wound upon the drum.
Figure 18:
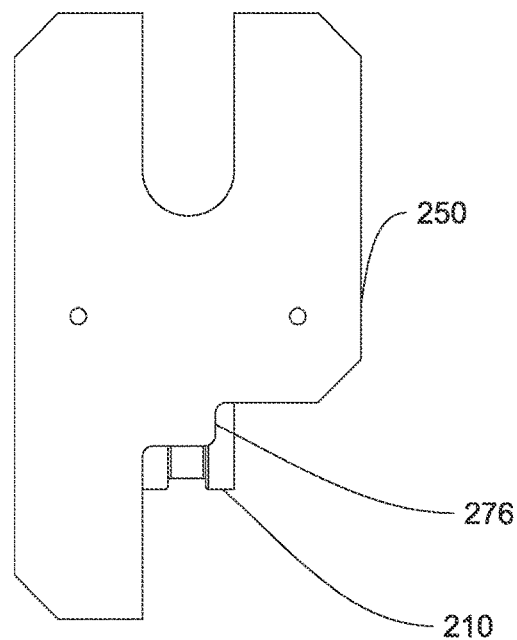
FIG. 18 is a close-up view showing a protrusion covering the front of the guide roller.
Figure 19:
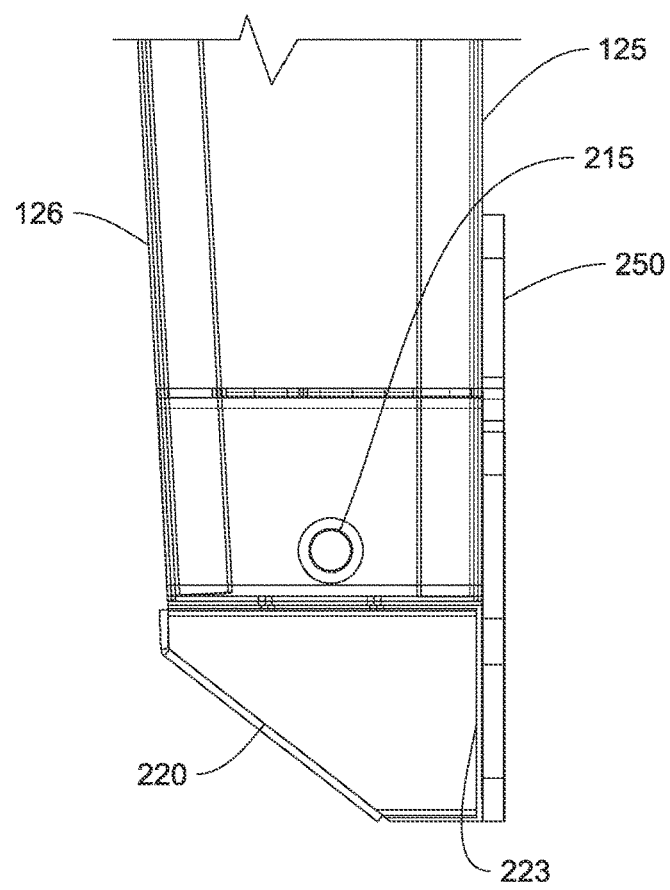
FIG. 19 is a side view of the view illustrated in FIG. 17.
Figure 20:
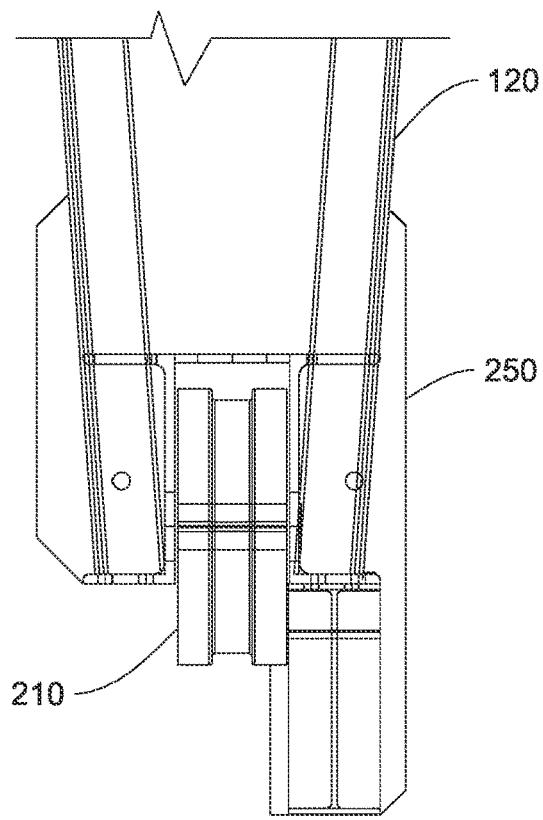
FIG. 20 is a rear view of the of the view illustrated in FIG. 17.
Figure 21:
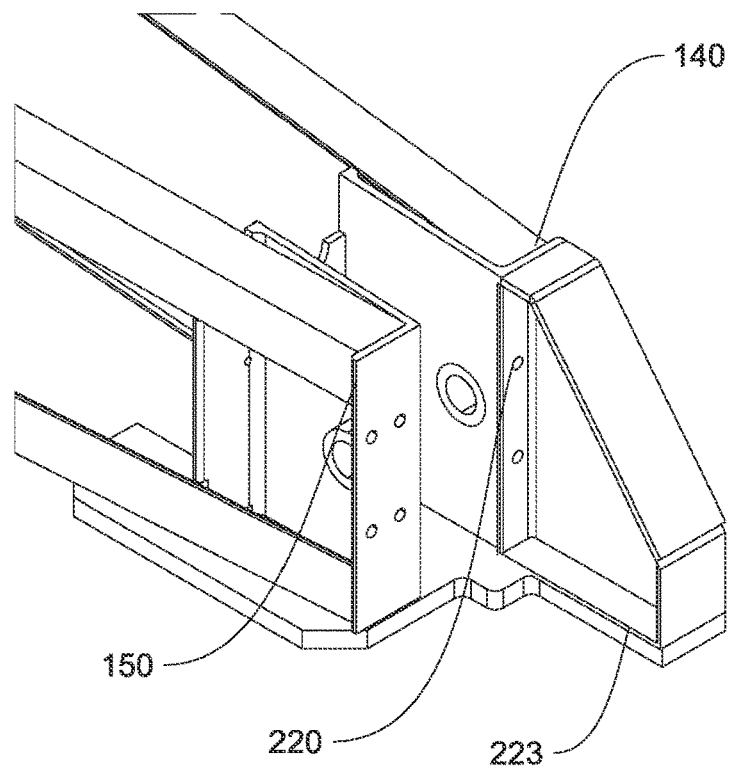
FIG. 21 is a lower perspective view of the view illustrated in FIG. 17.
Figure 22:
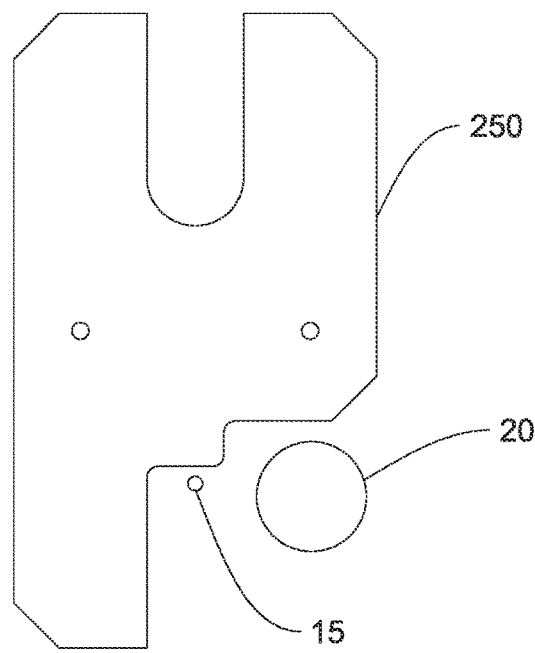
FIG. 22 is a sketch showing the plate clearance of a sanitary sewer pipe when the plate is oriented for use with one leg and the sanitary sewer pipe is close to the right side of the water pipe, as illustrated.

As seen in FIG. 6, a winch 200 is supported by the frame 120 and can rotate a drum 201. The winch 200 can turn the drum 201 in either rotational direction as selected by the user. The winch is preferably at or near the top 121 of the frame 120. A sheave 210 (or pulley wheel) is supported by the frame 120 at or near the bottom 122 of the frame. The sheave 210 has a channel 211 (FIG. 18) or groove and is mounted with a pin 215 (FIG. 19). The sheave 210 is a bearing surface that the cable and lead pipe 15 can turn around to change direction of the force from vertical (from winch) to horizontal (to pull pipe along the pipe axis 16). The cable and pipe 15 are received within the channel of the drum when the pipe is being pulled. The drum 201 rotates about a drum axis and the sheave 210 spins about a sheave axis. The drum axis is preferably parallel to the sheave axis. The drum axis is generally parallel to the front plane and to the rear plane.

Turning now to FIGS. 13, 16 and 19-22, it is seen that a leg 220 is provided. The leg 220 has a top, 221, a bottom 222 and a front 223. The top of the leg 220 is selectably and removably mounted to the bottom of bracket 140. The top of the leg has bolt holes that align with holes 141 of the bracket so that it can be bolted thereto.

Figure 13:
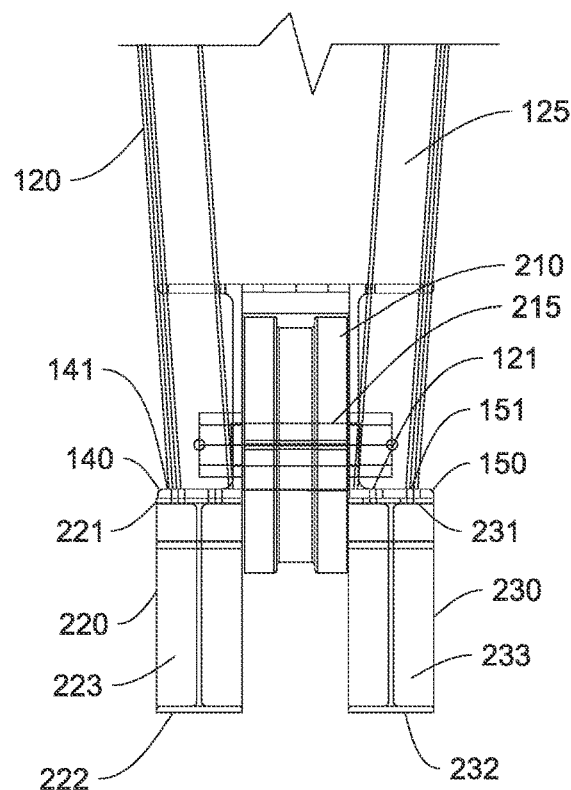
FIG. 13 is a view of the preferred embodiment of the frame with two legs attached.
Figure 23:
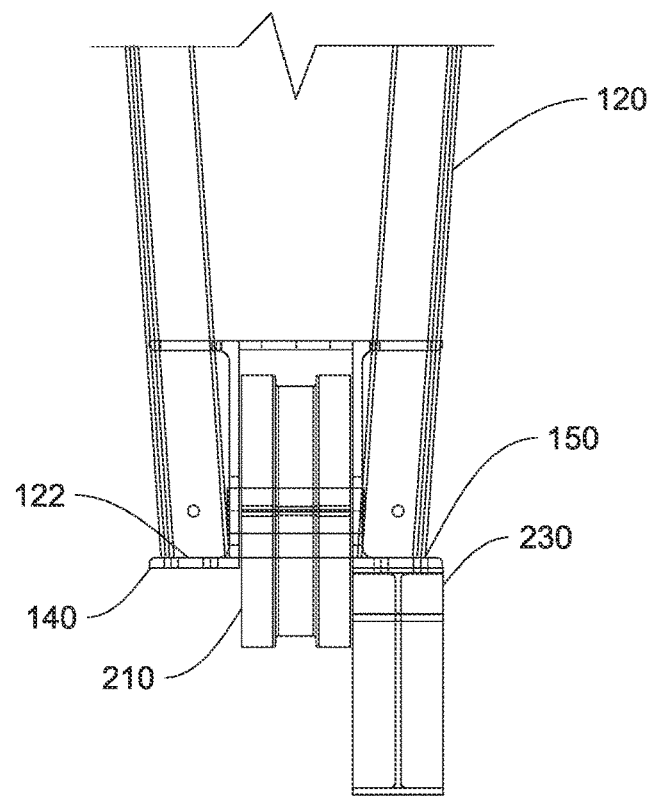
FIG. 23 is a view of the preferred embodiment of the frame with one leg attached.

Keeping with FIG. 13 and also looking at FIG. 23, it is seen that a leg 230 is provided. The leg 230 has a top, 231, a bottom 232 and a front 233. The top of the leg 230 is selectably and removably mounted to the bottom of bracket 150. The top of the leg has bolt holes that align with holes 151 of the bracket so that it can be bolted thereto.

It is appreciated that while bolts and holes are illustrated as a preferred fastening mechanism between the legs 220 and 230, and the frame 120, that other fasteners or securing structures or methods, such as clips, mating surfaces, screws, or otherwise could be used without departing from the broad aspects of the present invention.

Depending on the proximity of the sewer pipe 20 to the water pipe 15, either leg 220 or 230, or both legs 220 and 230 can be used. A leg is removed when it is necessary to provide clearance around the sanitary sewer pipe while removing the lateral water pipe.

It is appreciated that due to the selected rotation of a frame 120 relative to the mount, that a single removable leg 220A could be utilized without departing from the broad aspects of the present invention. In this regard, rotation of the frame 180 degrees would result in the same functionality of providing clearance left or right of the lateral water pipe as two removable legs provide if the two-leg embodiment did not have 180-degree rotation of the frame.

Figure 11:
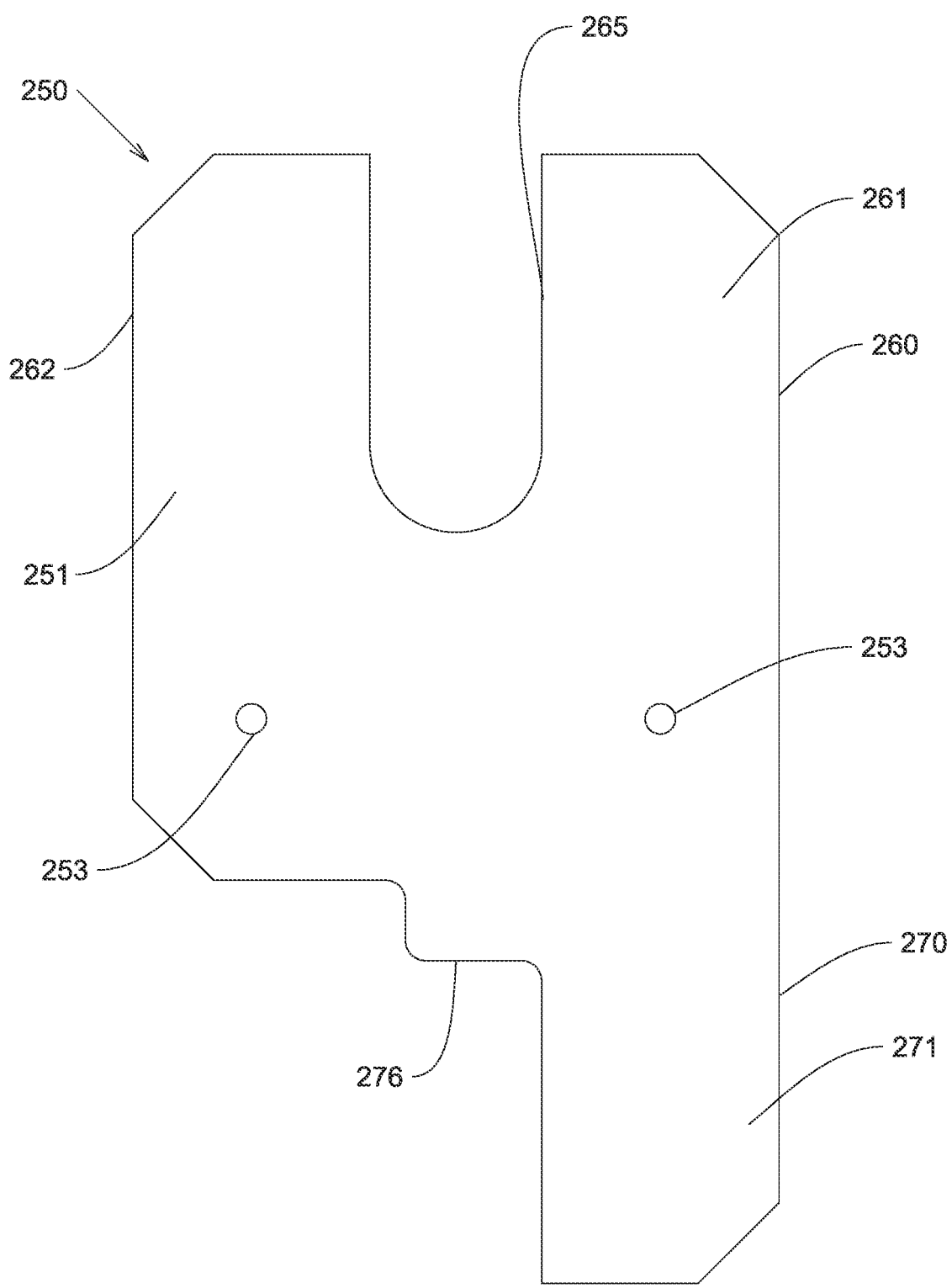
FIG. 11 is a first face view of a preferred embodiment of a face plate.
Figure 12:
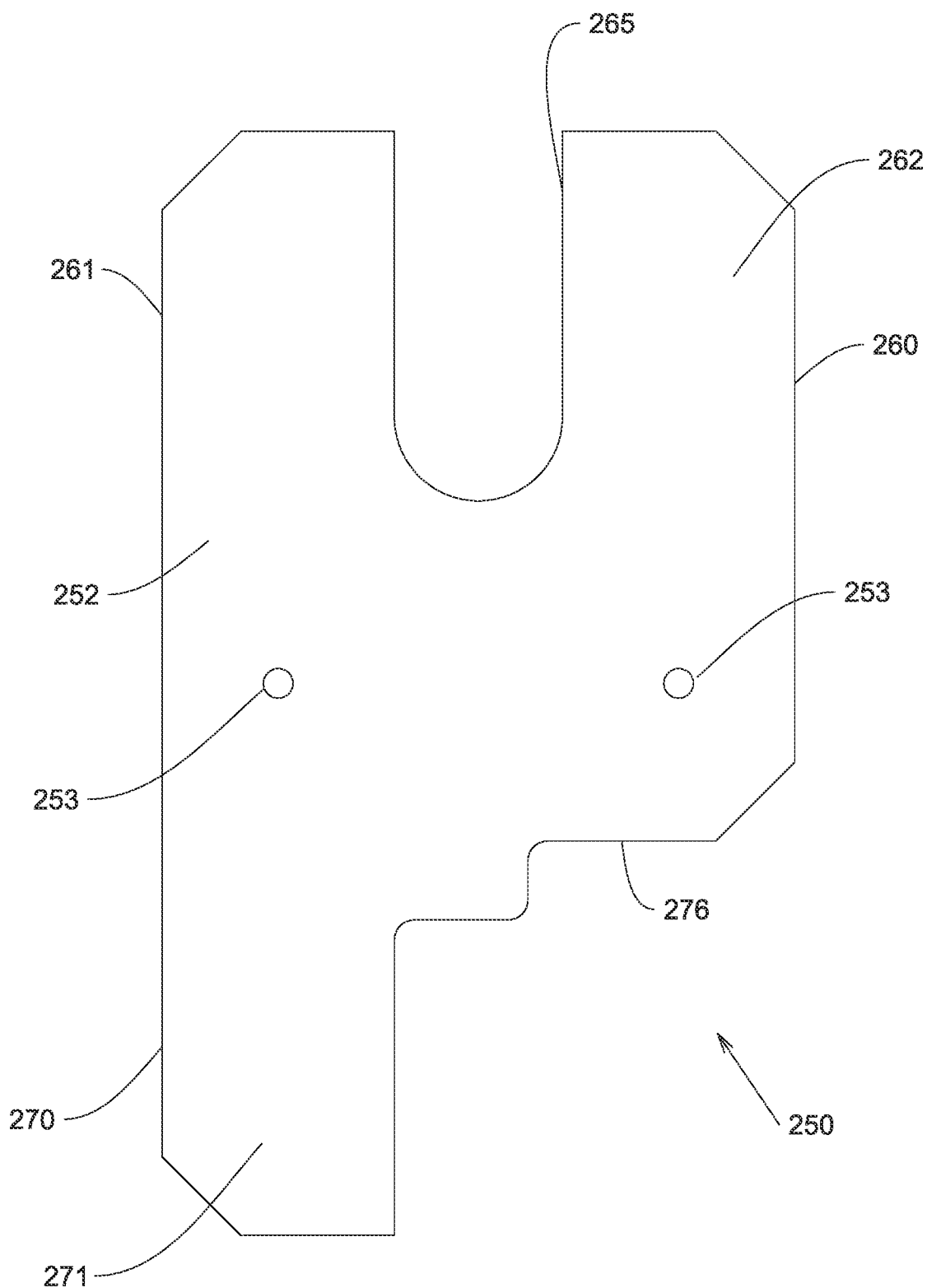
FIG. 12 is a second face view of the plate illustrated in FIG. 11.

A face plate 250 (or simply, plate) is provided and is seen in isolation in FIGS. 11 and 12. The plate 250 has two sides (or faces) 251 and 252, respectively. The plate has a first end section 260 with an arm 261 and an arm 262. The arms 261 and 261 are separated by a slot 265. The slot 265 has a preferably generally round inner end. An option neck (not shown) that is narrower than the maximum diameter of the generally round inner end could be used. The slot 265 allows the cable 30 or pipe 15 to pass through the slot 265 and seat on the sheave 210. Hence, the pipe pulling device can be lowered over an existing pipe for removal, and raised from a new pipe without disturbing or damaging the new pipe as it passes through the slot. The plate has a second end section 270 with a single arm 271 on one side and a generally centrally located protrusion 276. The plate can be made of aluminum, steel, or other suitably strong material. In one embodiment, the plate is 1 inch thick, about 28 inches tall and about 16-18 inches wide. It is appreciated that other dimensions could be used without departing from the broad aspects of the present invention.

The plate is preferably removably connected to the frame with bolts. The bolts pass through holes 253 which are preferably located in the middle of the plate (relative between the top and bottom of the plate). The orientation of the plate 250 relative to the frame corresponds to whether leg 220 or 230, or whether both legs 220 and 230 are connected to the frame 120. It is appreciated that while bolts and holes are illustrated as a preferred fastening mechanism between the plate 250 and the frame 120, that other fasteners or securing structures or methods, such as clips, mating surfaces, screws, or otherwise could be used without departing from the broad aspects of the present invention.

Figure 14:
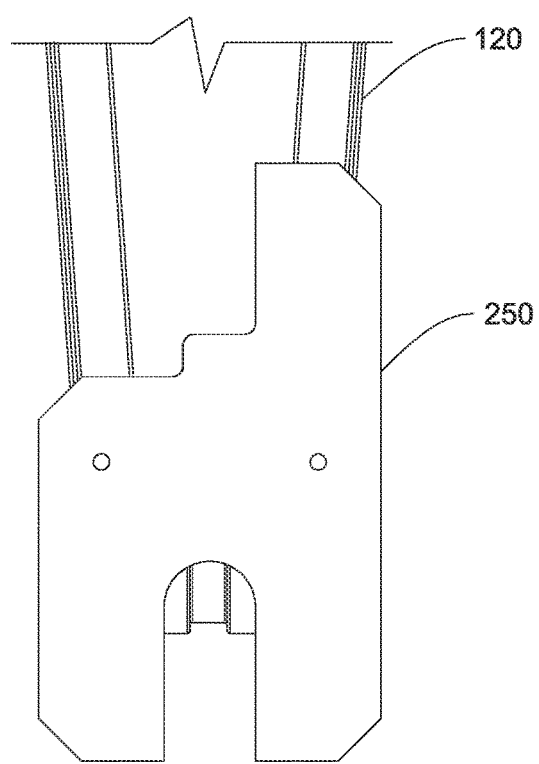
FIG. 14 is a front view showing the plate being supported by both legs.
Figure 15:
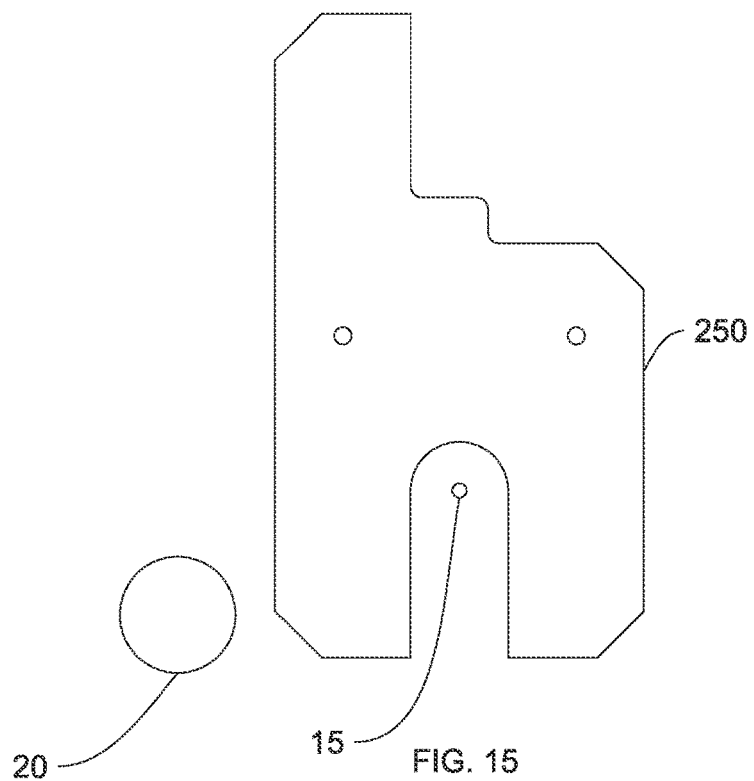
FIG. 15 is a sketch showing the plate clearance of a sanitary sewer pipe when the plate is positioned for use with two legs.

A first orientation of the plate 250 when both legs are connected is illustrated in FIGS. 13-15. This orientation is used when the sewer pipe 20 is a safe distance from the water pipe 15.

A second orientation of the plate when only leg 220 is connected is illustrated in FIGS. 16-22. This orientation is used when the sewer pipe 20 is located to the right of the water pipe 15, as illustrated, and sewer pipe clearance is needed.

Figure 24:
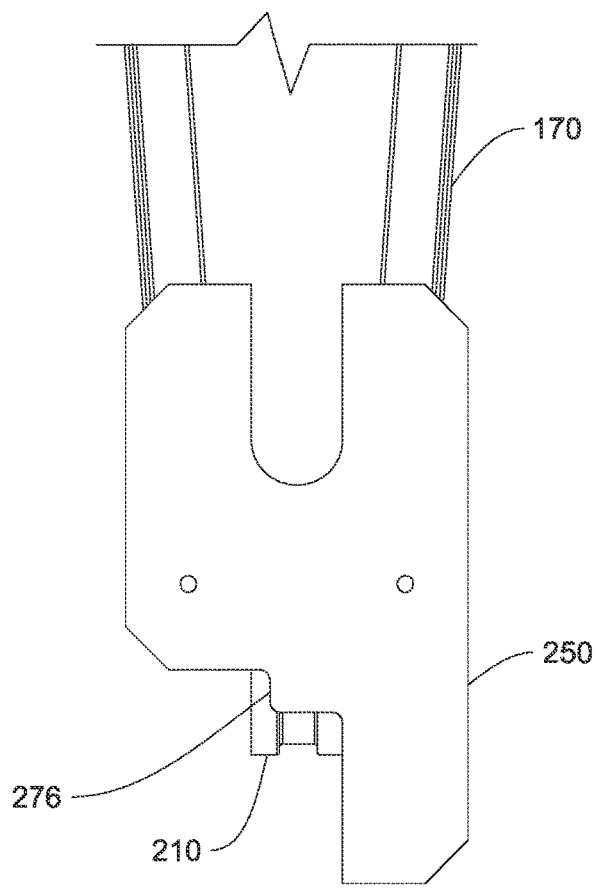
FIG. 24 is a front view showing the plate being oriented to be supported by the one leg.
Figure 25:
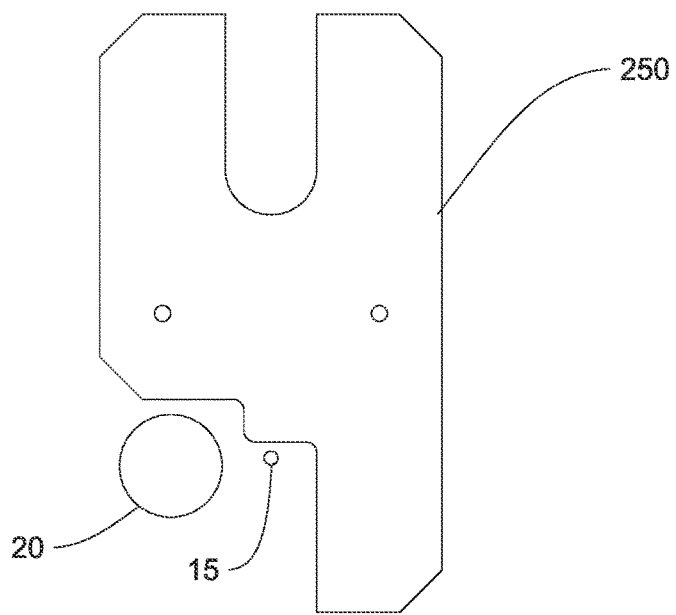
FIG. 25 is a sketch showing the plate clearance of a sanitary sewer pipe when the plate is oriented for use with one leg and the sanitary sewer pipe is close to the left side of the water pipe, as illustrated.

A third orientation of the plate when only leg 230 is connected is illustrated in FIGS. 23-25. This orientation is used when the sewer pipe 20 is located to the left of the water pipe 15, as illustrated, and sewer pipe clearance is needed.

Figure 26:
FIG. 26 is a sketch showing one fixed leg on one side of the frame.
Figure 27:
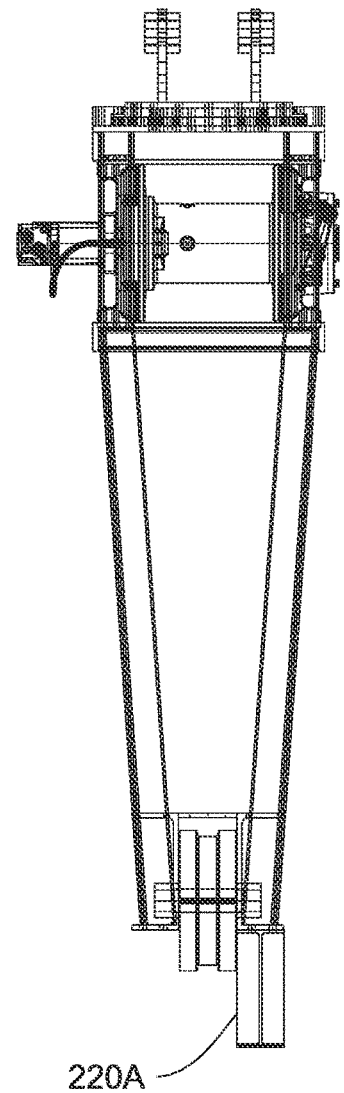
FIG. 27 is a sketch showing the frame and leg rotated 180 degrees about a vertical axis.

It is appreciated that the second and third orientation of the plate can be accomplished in one embodiment with a frame having one fixed leg 220A, as seen in FIGS. 26-27. In this embodiment, the fixed leg is preferably rectangular in profile with a vertical end face adjacent each side of the frame. The difference between the second and third orientations are a result of the frame being is rotated 180 degrees. In this regard, the effective position of the fixed leg can be either on the left or right (as illustrated), and the plate hence can be flipped about a vertical axis so that the arm can be supported by the left or right-side leg. The winch is operable in either rotational direction, whereby the pipe pulling assembly is operable with the plate being in any of the three orientations described above. In this embodiment, it is appreciated that the front and rear frame planes are preferably parallel to each other.

As a further alternative, the single leg cold be removable and/or a second removable leg could be provided.

Figure 4:
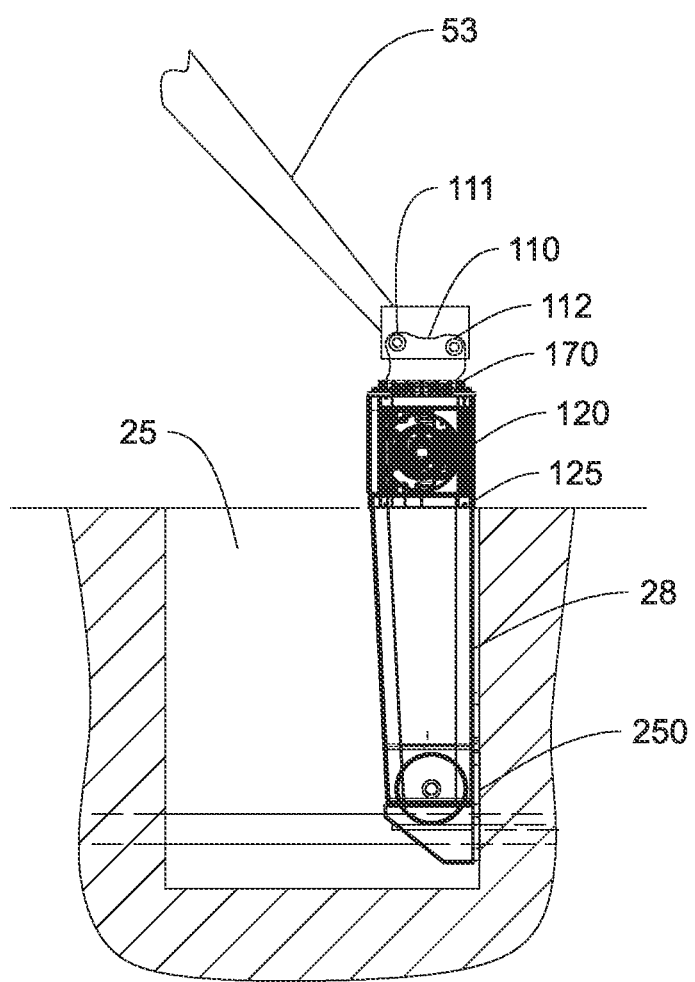
FIG. 4 is a side view showing the pipe pulling assembly in position lowered into a pit.
Figure 5:
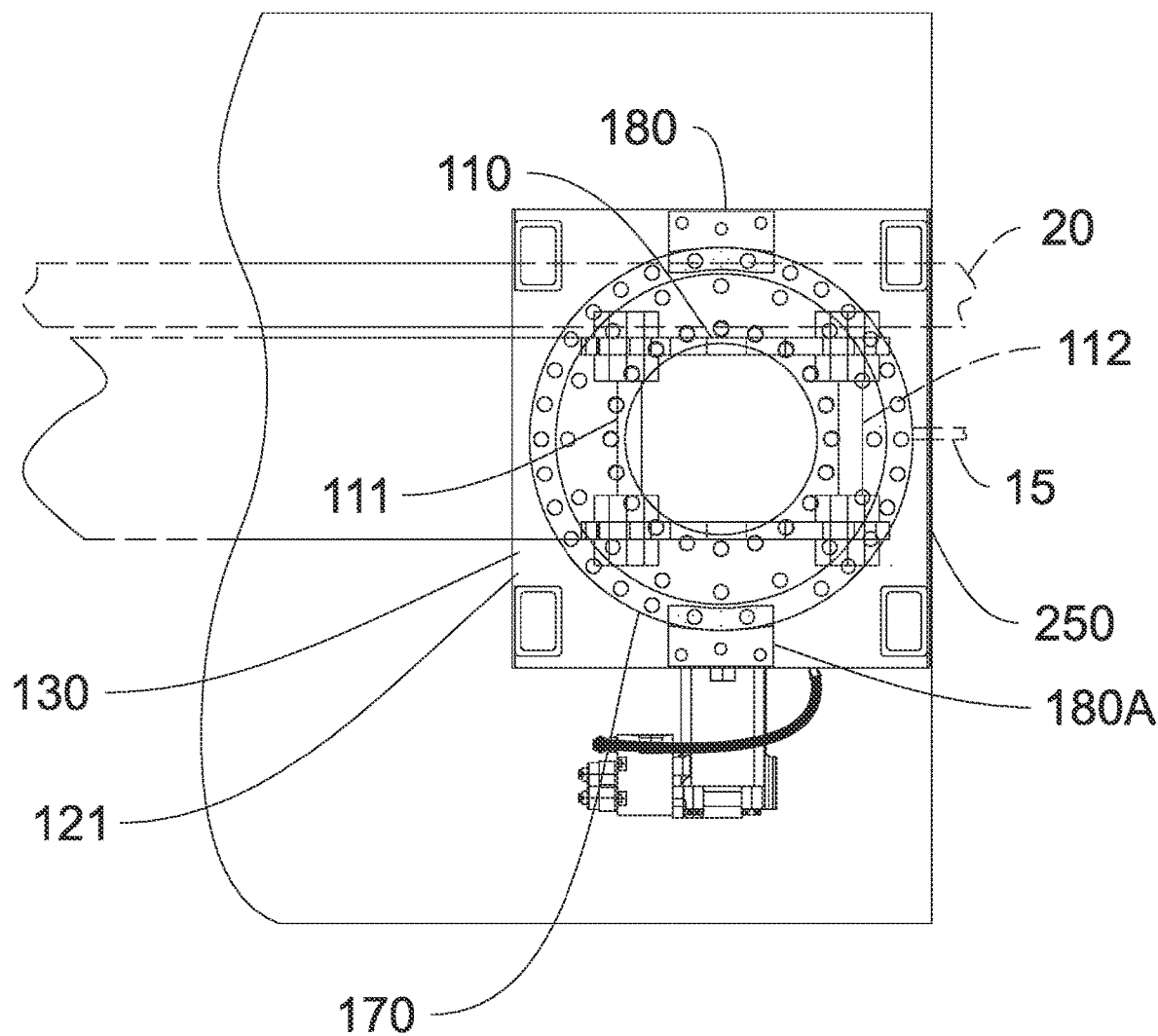
FIG. 5 is a top view of the pipe pulling assembly illustrated in FIG. 4.

Looking now at use of the pipe pulling assembly 100, it is first connected to the machine. Then, once the pit is prepped, the desired leg or legs are attached (or frame is rotated with one fixed leg for left or right clearance, or a removable leg is attached if there is not a clearance issue). The number and which legs are attached is determined by the proximity of the sewer pipe 20 to the water pipe 15. The orientation of the plate is determined, per the leg or legs attached, and it is secured to the frame with bolts. The pipe pulling assembly is then lowered into the pit as seen in FIG. 4. The rotation of the frame 120 relative to the mount 110 is adjusted, if necessary, and locked in place, so that the plate is directly engageable with the pit wall and is perpendicular to the lead pipe axis. The plate 250 is seen engaging the wall in FIGS. 4-9.

The cable 30, which was previously fed through the pipe 15 until the cable end termination 35 engages the trailing or distal end of the pipe, is attached to the drum 201. The proximal end of the cable is attached to the drum 201 and the winch then can be used to wind the drum. A sequence of views in FIGS. 6-9 shows the cable winding and the pipe 15 winding onto the drum 201 under operation of the winch 200 after being pulled around the sheave.

Turning now to FIG. 30, it is seen how the pipe pulling assembly can be oriented to pull a pipe 15 located in the corner of the pit. Instead of orienting the frame generally vertically, the frame can be slanted or angled so that the sheave 210 is located closer in the corner. In order to orient the frame at a preferred angle, the machine 50 is moved to a side of the pit 25 that is perpendicular to the water pipe axis 16. Then, because the frame can be angled to approximately 45 degrees, the perimeter of the sheave 210 can be positioned close to the corner of the pit, especially with the leg closest to the pit wall being removed for wall clearance. It is understood that the plate could be connected to the frame before pulling the pipe.

It is appreciated that a plate could be made sufficiently strong so as to withstand bending, whereby the invention could be made without support legs.

Turning now to FIGS. 31-38, it is seen that a corner access assembly 300 is illustrated having a body 301. The body 301 has two mounting sides 302 and 303 that can be selectably connected to mounting blocks 340, three open sides 304, 305 and 306 and a closed 307 side. The mounting sides are adjacent to each other, and both are perpendicular to the closed side 307. A roller support 310 is within the body 301. The roller support 310 supports several rollers 320 between the roller support 310 and closed side 307. There are preferably five rollers, each with a rotation axis parallel to the rotation axis of adjacent rollers, that are aligned in an arc shape. A plate 330 with an off-centered slot 331 is also provided. The slot is preferably adjacent to one side edge of the plate. The mounting blocks provide clearance for the sheave.

Figure 35:
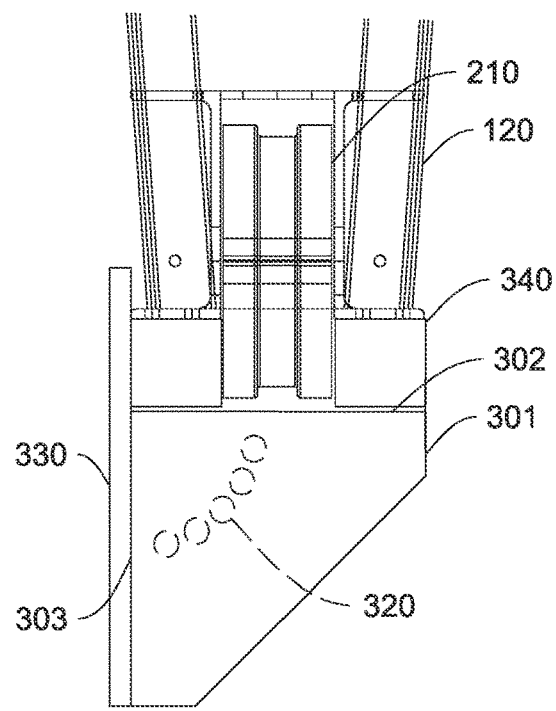
FIG. 35 is a side view showing the corner access assembly tipped to a first position below the frame.
Figure 36:
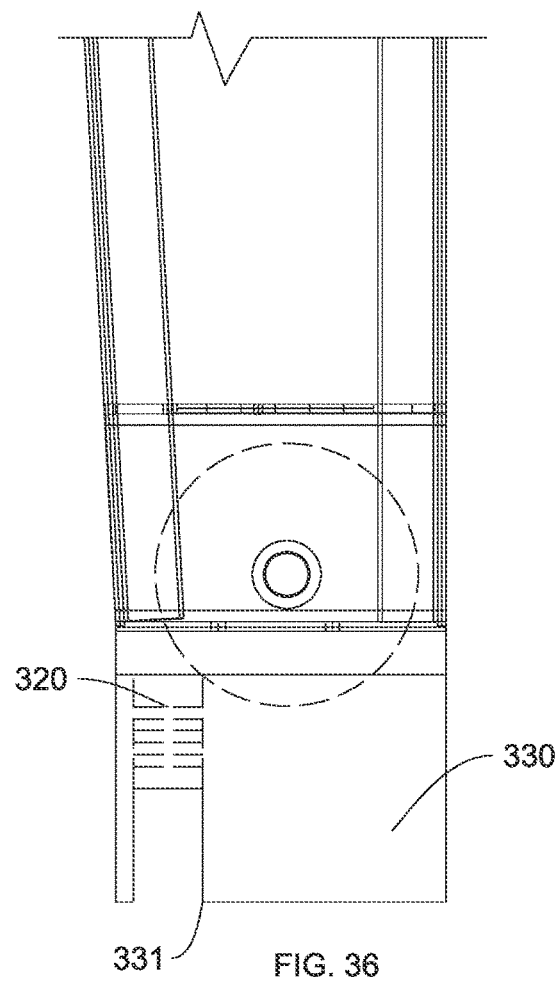
FIG. 36 is an end view showing the side slot of the corner access assembly when attached for a left slot configuration, as illustrated.
Figure 37:
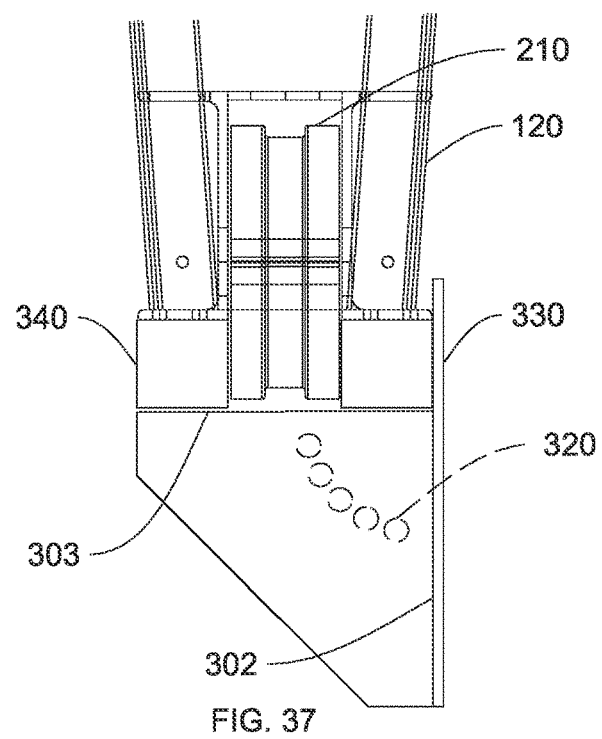
FIG. 37 is an exploded view showing the corner access assembly tipped to a second position below the frame.
Figure 38:
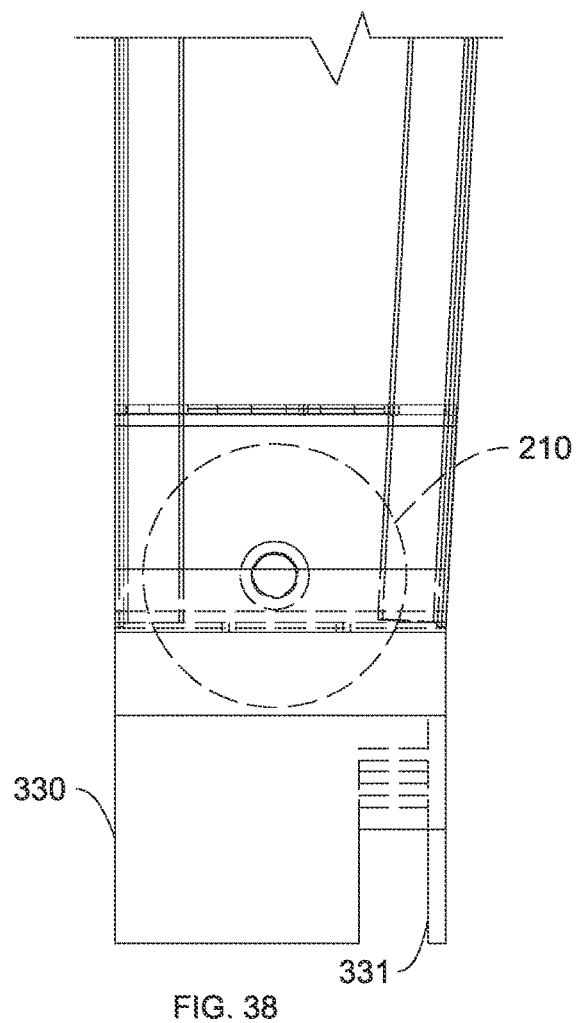
FIG. 38 is a side view showing the side slot of the corner access assembly when attached for a right slot configuration, as illustrated.

The first mount side 302 or second mount side 303 can be connected to the bottom of the frame 210. The plate 310 is then connected to the other mount side. In FIGS. 35-36, the corner access assembly is oriented for a right corner pull when viewed from the back, looking towards the front of the pit. In this orientation, the first mount side 302 is attached to the frame and the plate 310 is attached to the second mount side 303. In FIGS. 37-38, the corner access assembly is oriented for a left corner pull when viewed from the back, looking towards the front of the pit. In this orientation, the second mount side 303 is attached to the frame and the plate 310 is attached to the first mount side 302.

In either orientation, the plate 310 is on a side of the pipe pulling assembly, and lies in a plane perpendicular to the sheave axis of rotation. The slot 331 is aligned with the bearing surface of the rollers 320. The rollers 320 are aligned with the sheave, wherein a pipe pulled over the rollers 320 is immediately aligned with the sheave 210 so that it can be pulled up to the drum 201 of the winch 200.

It is also appreciated that a side brace could be used to provide further stability to the pipe pulling assembly, wherein the side brace would engage the pit wall laterally and provide a lateral anchor point.

In use, the corner access assembly 300 is mounted to the bottom 122 of the frame 120 and the plate 310 is attached to the body 301 in the selected left or right orientation. The corner access assembly can be mounted to the frame so that the plate 330 is on either side of the frame 120. The winch can wind the drum in either direction. In this regard, the sheave acts as a guide to direct the cable and pipe vertically after disengaging from the rollers towards the drum. The rollers are indexing rollers that are oriented around a central axis that is perpendicular the sheave axis of rotation. This reorients the pulling force 90 degrees, allowing the front end of the sheave to be placed near a sidewall of the pit to pull, at a 90-degree angle, a pipe 15 located in the corner of the pit. The machine 50 can approach the pit from a direction perpendicular to the water pipe access so that the slot is close to the pit wall where the water pipe is located. It is appreciated that in this embodiment, the vertical pulling force from the winch 200 to rollers 320 is generally vertical, and occurs along the pit sidewall.

Thus, it is apparent that there has been provided, in accordance with the invention, pipe pulling apparatus that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A pipe pulling assembly for pulling a pipe from a wall of a pit, said pipe pulling assembly comprising:
    a frame;
    a winch supported by said frame;
    a first leg removably supported by said frame;
    a second leg removably supported by said frame; and
    a plate being selectably oriented to connect to the frame in a first orientation when said first leg and said second leg are supported by said frame, in a second orientation when only said first leg is supported by said frame and in a third orientation when only said second leg is supported by said frame.

2. The pipe pulling assembly of claim 1 wherein said plate provides support against the wall more than 180 degrees around the pipe.

3. The pipe pulling assembly of claim 2 wherein said plate provides support against the wall 270 degrees around the pipe.

4. The pipe pulling assembly of claim 1 wherein said plate comprises:
    a first end section with a first end section first arm and a first end section second arm, said first end section first arm being separated from said first end section second arm with a slot; and
    a second end section with a second end section arm.

5. The pipe pulling assembly of claim 4 wherein said first section first arm is diagonal to said second section arm.

6. The pipe pulling assembly of claim 4 wherein said second section of said plate further comprises a protrusion, said protrusion covering a portion of a sheave when said plate is in second orientation and said third orientation.

7. The pipe pulling assembly of claim 1 wherein said plate has two holes therethrough located at a vertical midline of said plate.

8. The pipe pulling assembly of claim 1 further comprising:
    a mount; and
    a rotator, said rotator rotatably separating said mount from said frame.

9. The pipe pulling assembly of claim 8 wherein said rotator comprises:
    a slew ring with an outer perimeter having a plurality of holes; and
    a lock with two vertically operable pins, either of said two vertically operable pins selectably engaging one of said plurality of holes to lock said frame in a selected rotational position with respect to said mount.

10. A pipe pulling assembly for pulling a pipe from a wall of a pit, said pipe pulling assembly comprising:
    a frame;
    a winch supported by said frame;
    a sheave supported by said frame;
    a first leg supported by said frame;
    a second leg removably connected to said frame; and
    a plate, said plate having a first end section with a first end section first arm and a first end section second arm, the plate further having a second end section with a second end section arm, wherein said first end section first arm is separated from said first end section second arm with a slot.

11. The pipe pulling assembly of claim 10 wherein:
    said first end section first arm is diagonal to said second end section arm; and
    said plate has two holes therethrough located at a vertical midline of said plate.

12. The pipe pulling assembly of claim 10 further comprising:
    a mount; and
    a rotator, said rotator rotatably separating said mount from said frame, said rotator comprising:
        a slew ring with an outer perimeter having a plurality of holes; and
        a lock with two vertically operable pins, either of said two vertically operable pins selectably engaging one of said plurality of holes to lock said frame in a selected rotational position with respect to said mount.

13. A plate for use with a pipe pulling device, said plate comprising:
    a first section with a first section first arm and a first section second arm, said first section first arm being separated from said first section second arm with a slot, said slot having a slot axis that is a plate axis wherein said first section first arm is on a first plate axis side and said first section second arm is on a second plate axis side; and a second section with a second section arm, said second section arm being entirely on either of said first plate axis side or said second plate axis side.

14. The plate of claim 13 wherein said first section first arm is diagonal to said second section arm.

15. The plate of claim 13 wherein said second section of said plate further comprises a protrusion, said plate axis passing through said protrusion.

16. The plate of claim 13 wherein said plate has two holes therethrough located at a vertical midline of said plate, said vertical midline being half way between a first section distal end and a second section distal end.

17. A pipe pulling assembly for pulling a pipe from a wall of a pit, said pipe pulling assembly comprising:
   a frame;
   a winch supported by said frame;
   a sheave supported by said frame;
   a leg supported by said frame; and
   a plate, said plate having a first end section and a second end section, said second end section having a second end section arm;
   a mount; and
   a rotator, said rotator rotatably separating said mount from said frame, said rotator comprising:
      a slew ring with an outer perimeter having a plurality of holes; and
      a lock with two vertically operable pins, either of said two vertically operable pins selectably engaging one of said plurality of holes to lock said frame in a selected rotational position with respect to said mount.

18. A pipe pulling assembly for pulling a pipe from a wall of a pit, said pipe pulling assembly comprising:
   a frame;
   a winch supported by said frame;
   a sheave supported by said frame;
   a first leg supported by said frame;
   a second leg removably connected to said frame; and
   a plate, said plate having:
      a first end section with a first end section first arm and a first end section second arm, said first end section first arm and said first end section second arm being separated by a slot, said slot having a slot axis that is a plate axis wherein said first end section first arm is on a first plate axis side and said first end section second arm is on a second plate axis side; and
      a second end section with a second end section arm, said second end section arm being entirely on either of said first plate axis side or said second plate axis side,
   wherein:
      said plate configured to be selectably positioned in a first position wherein said second end section arm is adjacent to said first leg; and
      said plate configured to be selectably positioned in a second position when said second leg is connected to said frame wherein said each of said first end section first arm and said first end section second arm are individually adjacent to one of said first leg and said second leg.

* * * * *